US011914316B2

(12) United States Patent
Uehara

(10) Patent No.: US 11,914,316 B2
(45) Date of Patent: Feb. 27, 2024

(54) IMAGE FORMING APPARATUS FOR CONTROLLING HEATER OF FIXING UNIT POWERED BY TWO POWER SOURCES

(71) Applicant: CANON KABUSHIKI KAISHA, Tokyo (JP)

(72) Inventor: Takashi Uehara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/867,912

(22) Filed: Jul. 19, 2022

(65) Prior Publication Data

US 2023/0028851 A1 Jan. 26, 2023

(30) Foreign Application Priority Data

Jul. 21, 2021 (JP) ................................ 2021-120810

(51) Int. Cl.
*G03G 15/20* (2006.01)
*H05B 3/00* (2006.01)
*H05B 47/155* (2020.01)

(52) U.S. Cl.
CPC ....... *G03G 15/205* (2013.01); *G03G 15/2039* (2013.01); *G03G 15/2042* (2013.01); *H05B 3/0066* (2013.01); *H05B 47/155* (2020.01); *H05B 2203/037* (2013.01)

(58) Field of Classification Search
CPC ............ G03G 15/2039; G03G 15/205; G03G 15/2042; G03G 15/5004; H05B 1/0241; H05B 3/0066; H05B 39/02; H05B 39/06; H05B 39/09; H05B 47/155; H05B 2203/037
USPC ................................ 399/69, 70, 88, 330, 334
See application file for complete search history.

(56) References Cited

U.S. PATENT DOCUMENTS 5,329,343 A * 7/1994 Saito .................... G03G 15/205 399/70
5,512,993 A 4/1996 Endo et al.
6,301,454 B1 * 10/2001 Nishida .............. G05D 23/1951 399/334
6,654,572 B2 11/2003 Kataoka
6,900,419 B2 * 5/2005 Takagi ............... G03G 15/2053 399/329

(Continued)

FOREIGN PATENT DOCUMENTS

CN 1497392 A * 5/2004 ........... G03G 15/205
JP 2000-243537 A 9/2000

(Continued)

OTHER PUBLICATIONS

Co-pending U.S. Appl. No. 17/867,878, filed Jul. 19, 2022.

(Continued)

*Primary Examiner* — Robert B Beatty
(74) *Attorney, Agent, or Firm* — Venable LLP

(57) ABSTRACT

A fixing unit includes a first heater, a first switch, a second heater, and a second switch. In an image forming mode, a controller controls the first switch and the second switch to keep a temperature of the fixing unit at a fixing temperature serving as a target temperature for fixing the image on the sheet. In a standby mode, the controller controls the first and second switches to keep the temperature of the fixing unit at a standby temperature, and controls the first and second switches such that a period in which a first current is supplied to the first heater and a period in which a second current is supplied to the second heater do not overlap.

14 Claims, 11 Drawing Sheets

(56) References Cited

U.S. PATENT DOCUMENTS

| | | | | |
|---|---|---|---|---|
| 10,139,759 | B2 | 11/2018 | Tamaki | |
| 2002/0085852 | A1 | 7/2002 | Kataoka | |
| 2005/0013622 | A1* | 1/2005 | Omoto | G03G 15/2042 399/69 |
| 2008/0069584 | A1 | 3/2008 | Sanada | |
| 2010/0028037 | A1* | 2/2010 | Song | G03G 15/2039 399/70 |
| 2010/0061754 | A1 | 3/2010 | Ishigaya et al. | |
| 2011/0142475 | A1 | 6/2011 | Kim | |
| 2016/0357135 | A1 | 12/2016 | Yamamoto | |
| 2018/0253040 | A1 | 9/2018 | Tamaki | |
| 2021/0200125 | A1 | 7/2021 | Harada | |
| 2021/0278794 | A1* | 9/2021 | Nakajima | G03G 15/5004 |
| 2023/0023564 | A1* | 1/2023 | Miyamoto | G03G 15/5004 |
| 2023/0251593 | A1* | 8/2023 | Uehara | G03G 15/205 399/69 |

FOREIGN PATENT DOCUMENTS

| | | | |
|---|---|---|---|
| JP | 2002182520 | A | 6/2002 |
| JP | 2010096969 | A | 4/2010 |
| JP | 4980165 | B2 | 7/2012 |
| JP | 5133015 | B | 1/2013 |
| JP | 2017021173 | A | 1/2017 |
| JP | 2018146712 | A | 9/2018 |
| JP | 2020-052247 | A | 4/2020 |
| JP | 2021-056274 | A | 4/2021 |

OTHER PUBLICATIONS

Co-pending U.S. Appl. No. 17/867,899, filed Jul. 19, 2022.

Extended European Search Report dated Dec. 14, 2022 in counterpart European Patent Appln. No. 22183501.0.

* cited by examiner

IMAGE FORMING APPARATUS FOR CONTROLLING HEATER OF FIXING UNIT POWERED BY TWO POWER SOURCES

BACKGROUND OF THE INVENTION

Field of the Invention

The present disclosure relates to an image forming apparatus for controlling heaters of a fixing unit powered by two power sources.

Description of the Related Art

In electrophotographic image forming apparatuses, a fixing device uses heat and pressure to fix a toner image to a sheet. The fixing device unit includes a heater for heating the sheet and the toner image. Japanese Patent Laid-Open No. 2017-021173 describes a fixing device provided with a halogen heater. In order to maintain good fixability of the toner image to the sheet, it is necessary to appropriately control the temperature of the heater. This temperature control is accomplished by turning the heater on/off. Incidentally, it has been pointed out that a flicker phenomenon occurs when the heater is turned on/off (Japanese Patent Laid-Open No. 2018-146712). "Flicker phenomenon" refers to a phenomenon in which the operations of other devices connected to an AC power supply are affected by fluctuations in the AC power supply voltage caused by inrush current and the like occurring in electrical devices connected to the AC power supply. Flickering of lighting devices can be given as a typical example of the flicker phenomenon.

A short-time flicker value (Pst value) and a long-time flicker value (Plt value), which are defined by the IEC (International Electrotechnical Commission) standard (IEC 61000-3-3), can be given as indicators that indicate the degree of flicker (flicker values). The Pst value indicates the degree of flicker measured over a 10-minute period. A Pst value of 1 is defined as a flicker that 50% of people find unpleasant. In addition, the IEC standard defines a Pst value≤1 as a standard value. On the other hand, the Plt value is the cubic average of the Pst value measured 12 times (over 2 hours). The IEC standard defines a Plt value≤0.65 as a standard value. An image forming apparatus is required to have a Pst value of no greater than 1 during image forming operations and a Plt value of no greater than 0.65 during standby.

Incidentally, it takes a fairly long time to raise a heater with high power consumption from ambient temperature to the target fixing temperature. Therefore, keeping the heater temperature at a standby temperature, which is higher than room temperature, during standby (preheating) shortens the time required to heat the heater to the target temperature. However, in controlling the temperature of the heater during standby, the heater is turned on/off repeatedly at a high frequency, which may exacerbate the long-time flicker during standby.

SUMMARY OF THE INVENTION

The embodiment of the disclosure provides an image forming apparatus comprising: an image forming unit that forms an image on a sheet, a fixing unit that fixes the image to the sheet, the fixing unit including: a first heater to which a first current is supplied from a first commercial power source to generate heat; a first switch that is provided in a current line between the first commercial power source and the first heater and that switches whether or not to supply the first current to the first heater; a second heater to which a second current is supplied from a second commercial power source different from the first commercial power source to generate heat, a heat generation distribution characteristic in a lengthwise direction of the second heater being different from a heat generation distribution characteristic in a lengthwise direction of the first heater; and a second switch that is provided in a current line between the second commercial power source and the second heater and that switches whether or not to supply the second current to the second heater; and a controller configured to: in an image forming mode in which the image is formed on the sheet, control the first switch and the second switch to keep a temperature of the fixing unit at a fixing temperature serving as a target temperature for fixing the image on the sheet; and in a standby mode in which the image is not formed on the sheet, control the first switch and the second switch to keep the temperature of the fixing unit at a standby temperature as a target temperature in the standby mode, and control the first switch and the second switch such that a period in which the first current is supplied to the first heater and a period in which the second current is supplied to the second heater do not overlap.

Further features of the present disclosure will become apparent from the following description of exemplary embodiments (with reference to the attached drawings).

DESCRIPTION OF THE EMBODIMENTS

Figure 1:
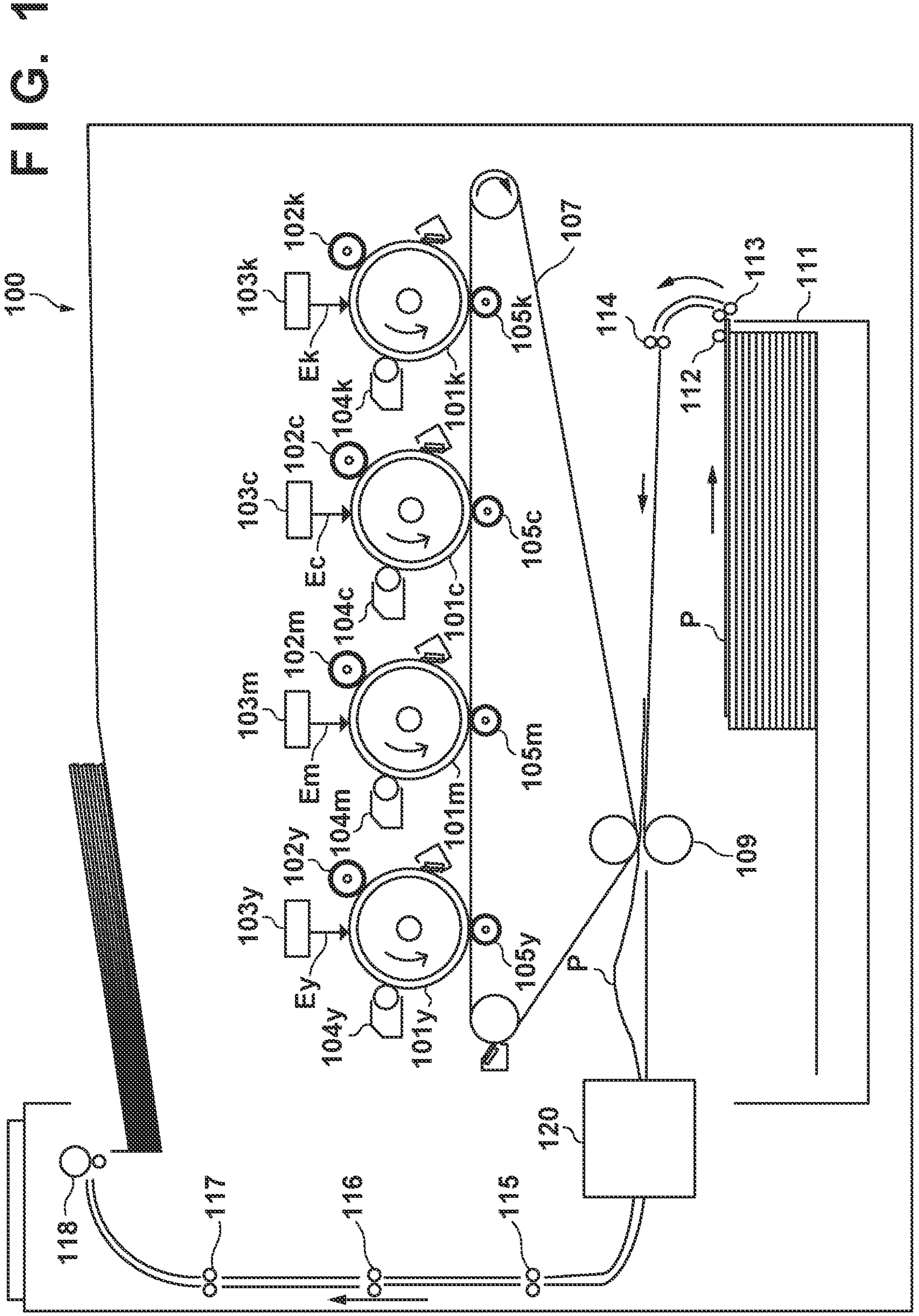
FIG. 1 is a diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Image Forming Apparatus

As illustrated in FIG. 1, an image forming apparatus 100 is an electrophotographic printer having four image forming stations. The image forming apparatus 100 may be commercialized as a copier, a multifunction peripheral, a facsimile device, or the like. Here, the first station forms a yellow "y" image. The second station forms a magenta "m" image. The third station forms a cyan "c" image. The fourth station forms a black "k" image. The operations and configuration of the four stations are identical or similar. Therefore, when matters common to all four colors are described, the letters y, m, c, and k will be omitted from the reference signs. The technical spirit of the present invention is also applicable to monochrome printers.

A photosensitive drum 101 is a rotating photosensitive member and image carrier that carries an electrostatic latent image and a toner image. A charging roller 102 is a charging member that uniformly charges the surface of the photosensitive drum 101. An exposure unit 103 emits a laser beam E according to an image signal to the photosensitive drum 101 and forms an electrostatic latent image on the surface of the photosensitive drum 101. A developer 104 adheres toner to the electrostatic latent image to form the toner image. A primary transfer roller 105 transfers the toner image from the photosensitive drum 101 to an intermediate transfer belt 107. That is, a full-color image is formed by transferring a yellow toner image, a magenta toner image, a cyan toner image, and a black toner image in order to the intermediate transfer belt 107. When the intermediate transfer belt 107 rotates, the toner image is transported to a secondary transfer part. A secondary transfer roller pair 109 is provided at the secondary transfer part.

A sheet cassette 111 is a sheet holder that can accommodate a large number of sheets P. A pickup roller 112 feeds a sheet P from the sheet cassette 111 to a transport path. A sheet feed roller 113 transports the sheet P downstream while suppressing overlapping transport of the sheets P. "Downstream" refers to being downstream in a transport direction of the sheets P. A resist roller 114 is a transport roller that reduces skew of the sheet P. The leading edge of the sheet P in the transport direction of the sheet P is pushed against the resist roller 114, which corrects skew in the sheet P. The sheet P is then transported to the secondary transfer part.

At the secondary transfer part, the secondary transfer roller pair 109 transfers the toner image from the intermediate transfer belt 107 to the sheet P. A fixing device 120 fixes the toner image to the sheet P by applying heat and pressure to the sheet P and the toner image. Transport rollers 115, 116, and 117 are disposed downstream from the fixing device 120 and transport the sheet P to a discharge roller 118. The discharge roller 118 is used to transport the sheet P to the exterior of the image forming apparatus 100 (e.g., a sheet tray).

Fixing Device

Figure 2:
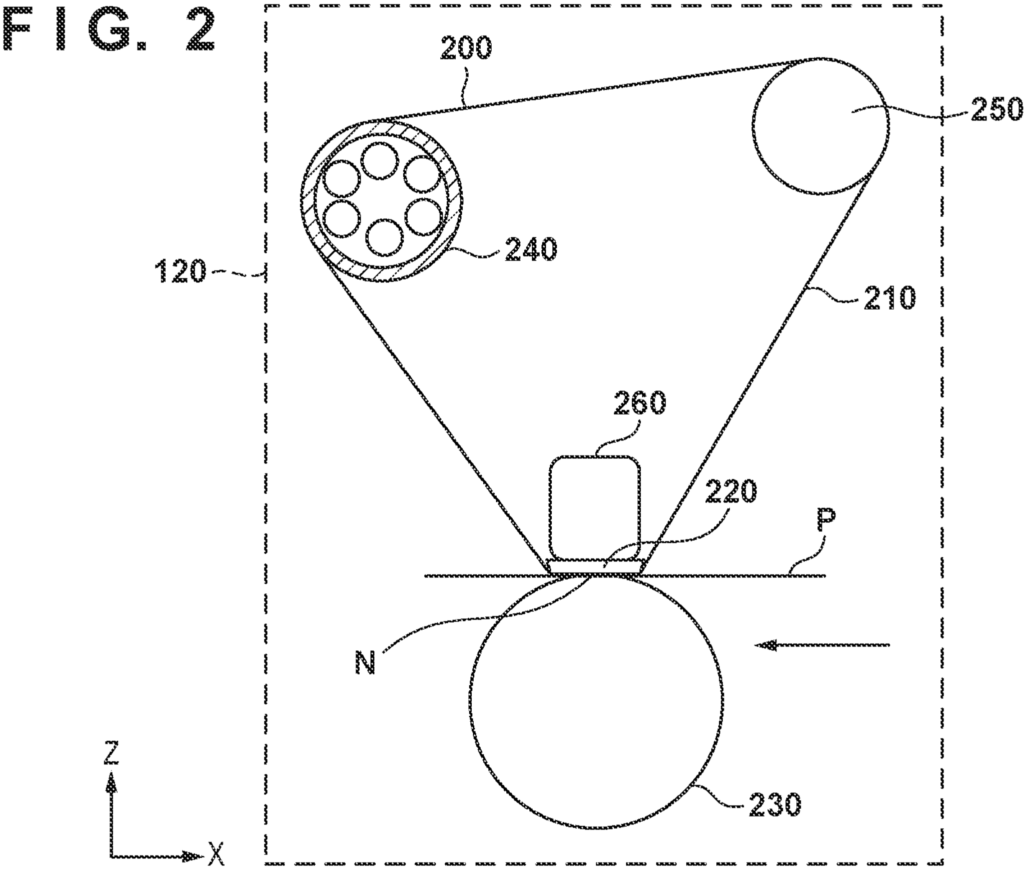
FIG. 2 is a diagram illustrating a fixing device.

As illustrated in FIG. 2, the fixing device 120 has a heating unit 200 centered on a rotatable endless fixing belt 210 that serves as a heat conduction medium. In FIG. 2, the Z direction is the height direction, and the X direction is parallel to the transport direction of the sheets P. The fixing belt 210 is stretched over a pad 220, a heating roller 240, and a tension roller 250. The heating roller 240 is a heating rotating body that contains a heater (e.g., a halogen heater). A halogen heater is a heater having a halogen lamp as a heating element. The heating roller 240 heats the fixing belt 210. The heating roller 240 is rotated by rotational power supplied from a motor or the like. The tension roller 250 is a tension roller that applies a predetermined tension to the fixing belt 210. The tension roller 250 is biased by an elastic body (e.g., a spring) supported by a frame (not shown) of the heating unit 200. The tension of this spring is, for example, 50 N. The tension roller 250 rotates driven by the fixing belt 210. The pad 220 supports an inner circumferential surface of the fixing belt 210 by a metal stay 260. Together with a pressure roller 230, the pad 220 sandwiches the fixing belt 210. What is known as a substantially flat nip part N is formed between the pad 220 and the pressure roller 230. At least one of the pressure roller 230 or the pad 220 may be biased by a biasing mechanism (not shown) such that the nip part N is formed at a predetermined length and width. Pressure and heat are applied to the sheet P and the toner image as the sheet P, to which the toner image has been transferred, passes through the nip part N. As a result, the toner image is fixed onto the sheet P.

The fixing belt 210 has thermal conductivity and heat resistance. The fixing belt 210 has a thin-walled cylindrical shape, the inner diameter of which is, for example, 120 mm. The fixing belt 210 may employ a three-layer structure having a base layer, an elastic layer provided on the outer circumference of the base layer, and a release layer provided on the outer circumference of the elastic layer. The thickness of the base layer is, for example, 60 μm. The material of the base layer is, for example, polyimide resin (PI). The thickness of the elastic layer is, for example, 300 μm. The material of the base layer is, for example, silicone rubber. The thickness of the release layer is, for example, 30 μm. The material of the release laver is, for example, fluorine resin. For example, PFA (polyfluoroethylene tetrafluoride/perfluoroalkoxyethylene copolymerization resin) can be used as the fluorine resin.

The material of the pad 220 is, for example, LCP (liquid crystal polymer) resin. The heating roller 240 may be a stainless steel pipe. The outer diameter of the pipe may be, for example, 40 mm. The thickness of the pipe may be, for example, 1 mm. A plurality of (e.g., six) heaters may be provided inside the pipe. The heat supplied by the heaters is conducted from the heating roller 240 to the fixing belt 210, and then from the fixing belt 210 to the sheet P and the toner image. The tension roller 250 may also be formed as a stainless steel pipe. The outer diameter of the pipe is, for example, 40 mm. The thickness of the pipe is, for example, 1 mm. The ends of the pipe may be rotatably supported by bearings (not shown).

The pressure roller 230 is, for example, a roller having an elastic layer and a release layer. The elastic layer is provided around the outer circumference of the rotating shaft of the pressure roller 230. Furthermore, the release layer is provided around the outer circumference of the elastic layer. The material of the rotating shaft may be metal (e.g., stainless steel). The thickness of the elastic layer is, for example, 5 mm. The material of the elastic layer is, for example, conductive silicone rubber. The thickness of the release layer is, for example, 50 μm. The material of the release layer is, for example, fluorine resin such as PFA.

Heater Arrangement

Figure 3:
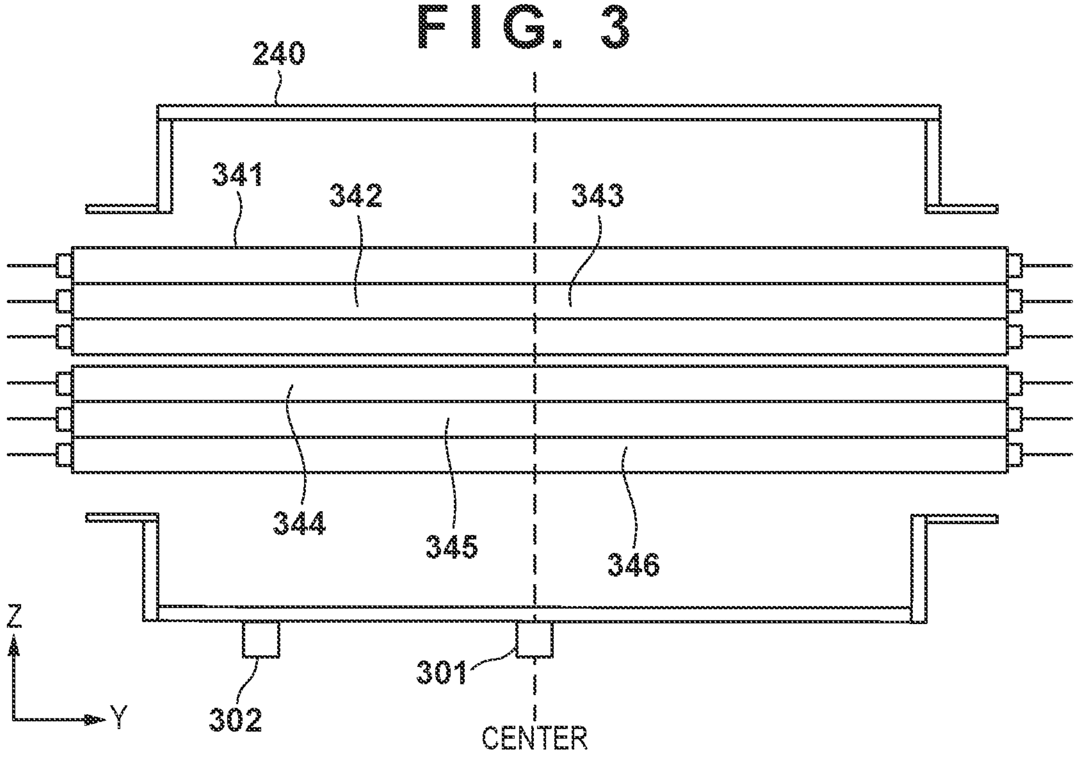
FIG. 3 is a diagram illustrating a heating roller.

FIG. 3 is a diagram schematically illustrating a cross-section taken along the rotation axis of the heating roller 240, in a plane parallel to the rotation axis of the heating roller 240. Six heaters 341 to 346 are supported by a holder (not shown) inside the heating roller 240. Thermistors 301 and 302 may be disposed to contact the outer circumferential surface of the heating roller 240. This makes it possible to accurately measure the surface temperature of the heating roller 240 or the fixing belt 210. The thermistor 301 may be disposed in the center with respect to a width direction of the heating roller 240 (this may be called the direction in which the heating roller 240 extends (the Y direction)). In other words, the Y direction is a direction parallel to the rotation axis of the heating roller 240. The thermistor 302 measures the surface temperature of the end of the heating roller 240.

Figure 4B:
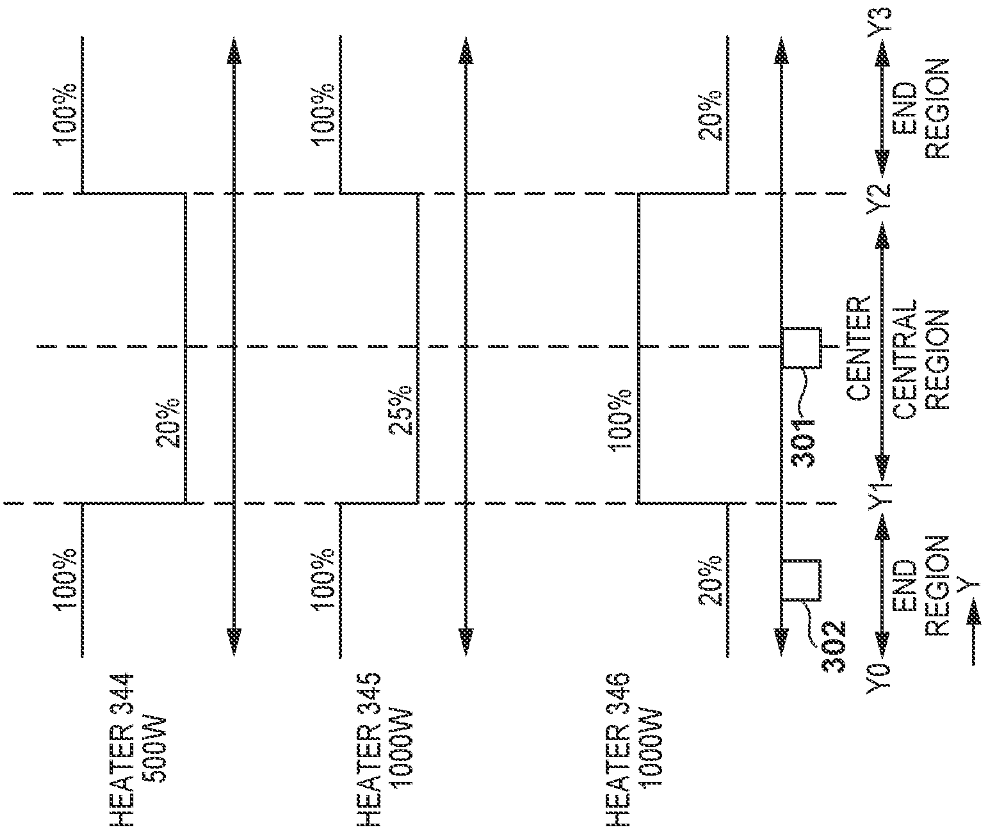
FIGS. 4A and 4B are diagrams illustrating the heat generation capacity of a heater.
Figure 4A:
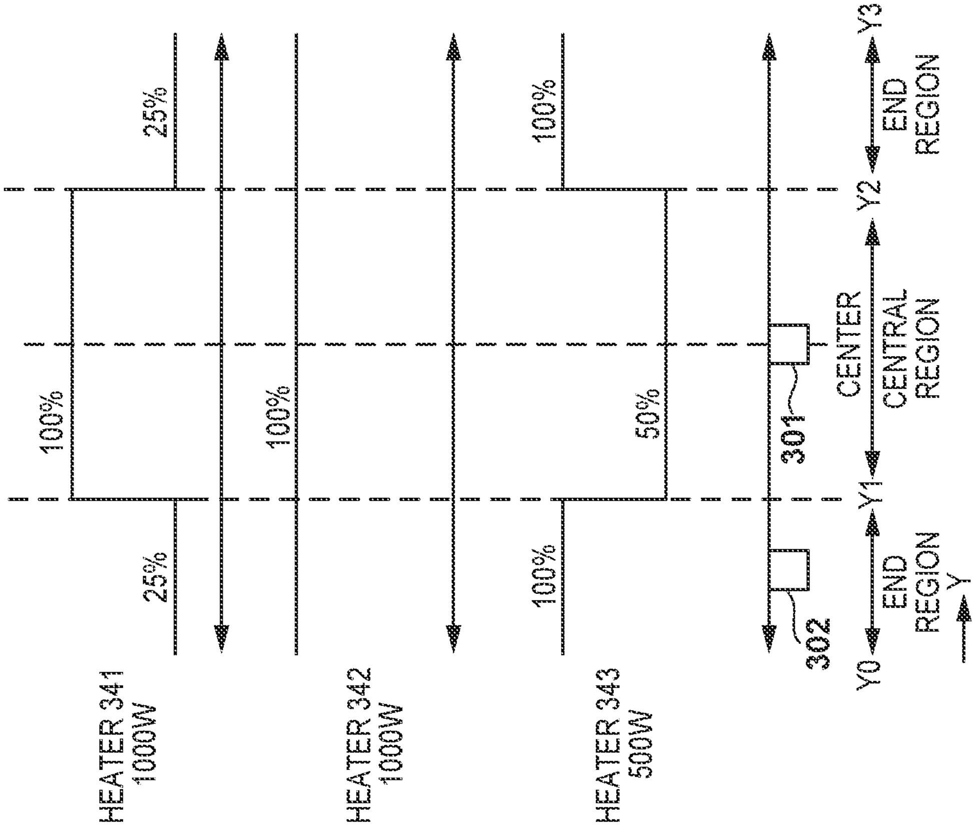

Heat Generation Distribution Characteristics (Heat Generation Capacity) of Heater FIG. 4A illustrates the heat generation distribution characteristics (heat generation capacity distribution) of the three heaters 341, 342, and 343, which form a first heater group. FIG. 4B illustrates the heat generation distribution characteristics of the three heaters 344, 345, and 346, which form a second heater group. The horizontal axis represents a position in the Y direction. The vertical axis represents the heat generation capacity. As illustrated in FIGS. 4A and 4B, each of the six heaters 341 to 346 may have different heat generation distribution characteristics.

Y0 indicates the position of one end of the heaters 341 to 346 (hereinafter referred to as a "left end"). Y3 indicates the position of the other end of the heaters 341 to 346 (hereinafter referred to as a "right end"). Y1 is a boundary between an end region at the left end and a central region. Y2 is a boundary between an end region at the right end and the central region. The length from Y0 to Y3 is, for example, 500 mm. The distance from Y0 to Y1 is, for example, 125 mm. The distance from Y0 to Y2 is, for example, 375 mm. In other words, the distance from Y1 to Y2 is 250 mm. Thus, the ratio of the length of one end region to the length of the central region may be 1:2.

The heater 341 and the heater 346 are the heat sources that primarily heat the central region. The heater 343, the heater 344, and the heater 345 are the heat sources that primarily heat the two end regions. The heater 342 is a heat source that heats the entire area, including the central region and the end regions, almost uniformly.

The power consumption (heater output) of each of the heaters 341, 342, 345, and 346 is, for example, 1000 W. The power consumption (heater output) of each of the heaters 343 and 344 is, for example, 500 W. Incidentally, the center of sheet P is transported so as to pass near the center in the Y direction, regardless of the width of the sheet P. For example, when a sheet P having a narrower length in the Y direction (width) is continuously transported, the operating ratio (energizing time) of the heaters 343, 344, and 345, which mainly heat the end regions, is reduced. This prevents excessive heat buildup in both end regions of the heating roller 240.

As illustrated in FIGS. 4A and 4B, the thermistor 301 is disposed in the center of the central region. The thermistor 302 is disposed in the center of the end region on the left side. In particular, the thermistors 301 and 302 are disposed so as not to overlap Y1 and Y2, such that the temperature in the central region (a central temperature M) and the temperature in the end regions (an end temperature R) are accurately detected.

The ratio of the heat generation capacity of the central region of the heater 341 is X %. The ratio of the heat generation capacity of the end region of the heater 341 is Y % (X>Y). Here, the power consumption of heater 341 is assumed to be 1000 W. Accordingly, the heat generation capacity of one end region of the heater 341 is a power equivalent of 100 W. The heat generation capacity of the central region of the heater 341 is a power equivalent of 800 W. For the remaining heaters 342 to 346, the heat generation capacity of each region can be calculated from the ratios and power consumptions indicated in FIG. 4A or FIG. 4B.

Controller

Figure 5:
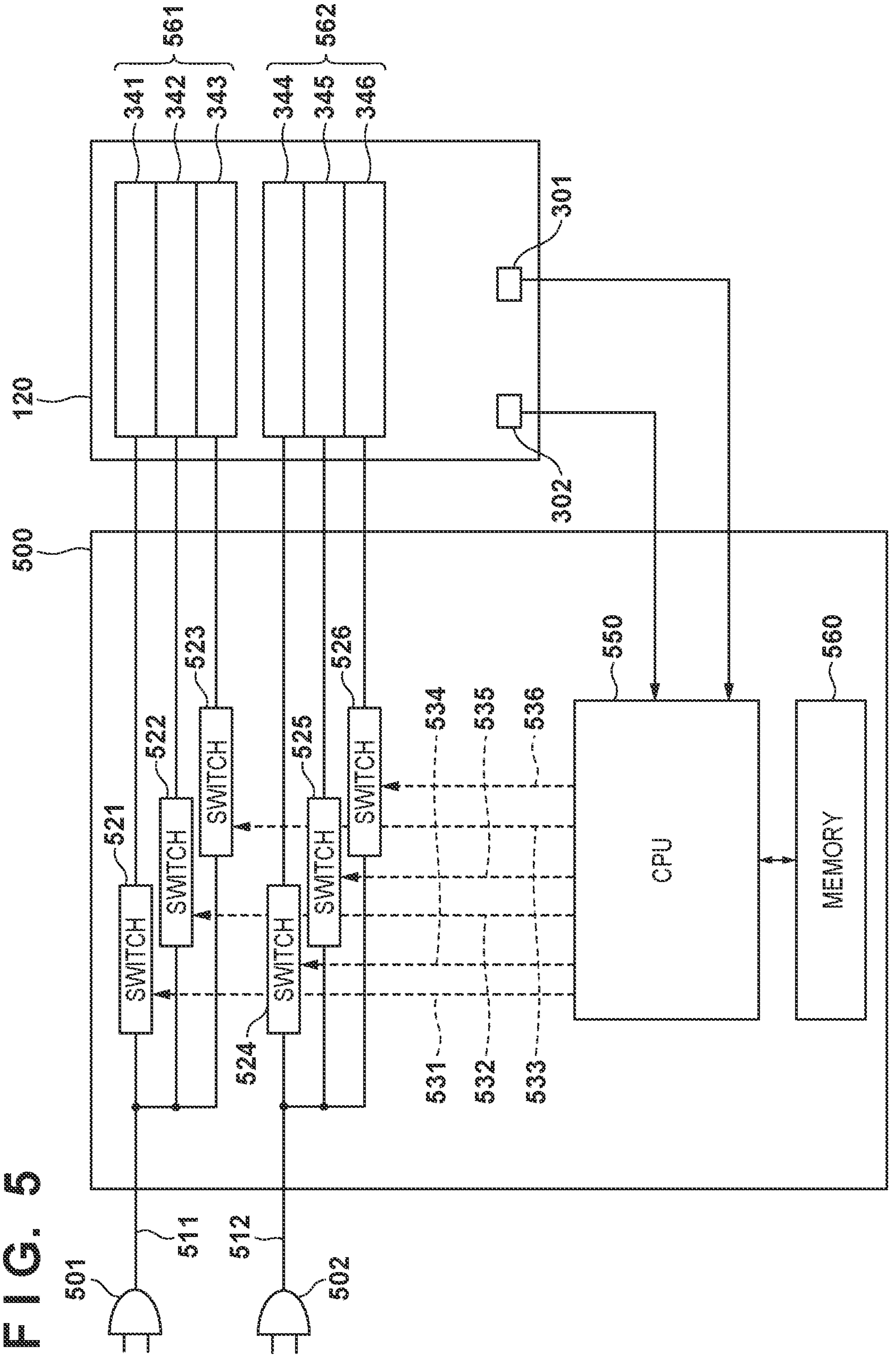
FIG. 5 is a diagram illustrating a control board.

As illustrated in FIG. 5, a control board 500 drives the heaters 341 to 346. Power cords 501 and 502 are connected to different AC power supply systems. The AC power supplied from the power cord 501 is supplied to a first heater group 561 via a first power system 511. The AC power supplied from the power cord 502 is supplied to a second heater group 562 via a second power system 512. The first heater group 561 includes the heaters 341, 342, and 343. The second heater group 562 includes the heaters 344, 345, and 346.

The control board 500 is provided with a CPU 550 and a plurality of switches 521 to 526. The CPU 550 controls the plurality of switches 521 to 526 according to a control program stored in memory 560. The memory 560 can include non-volatile memory (ROM), volatile memory (RAM), solid state drives (SSD), and hard disk drives (HDD).

The switch 521 is connected between the power cord 501 and the heater 341, and turns the heater 341 on/off according to a control signal 531 from the CPU 550. The switch 522 is connected between the power cord 501 and the heater 342, and turns the heater 342 on/off according to a control signal 532 from the CPU 550. The switch 523 is connected between the power cord 501 and the heater 343, and turns the heater 343 on/off according to a control signal 533 from the CPU 550. The switch 524 is connected between the power cord 502 and the heater 344, and turns the heater 344 on/off according to a control signal 534 from the CPU 550. The switch 525 is connected between the power cord 502 and the heater 345, and turns the heater 345 on/off according to a control signal 535 from the CPU 550. The switch 526 is connected between the power cord 502 and the heater 346, and turns the heater 346 on/off according to a control signal 536 from the CPU 550. The switches 521 to 526 may be switching elements such as triacs, thyristors, transistors, and insulated gate bipolar transistors (IGBTs), for example. However, any switch elements can be employed as the switches 521 to 526 as long as the switches can be controlled from the CPU 550 and have performance (rated voltage and rated current) commensurate with the power consumption of the heaters 341 to 346.

The CPU 550 detects the central temperature M of the heating roller 240 based on a detection signal output from the thermistor 301. The CPU 550 detects the end temperature R of the heating roller 240 based on a detection signal output from the thermistor 302. The CPU 550 determines the respective operating ratios (duty ratios) of the heaters 341 to 346 based on these temperatures. The CPU 550 outputs the control signals 531 to 536 according to the duty ratio of the heaters 341 to 346, respectively. The duty ratio determination may be made, for example, every set period (e.g., 10 seconds). The on/off switching of switches 521 to 526 is performed using a time equivalent to two half-waves of the AC power supply (one cycle of AC) as a unit.

Anti-Flicker

Figure 6A:
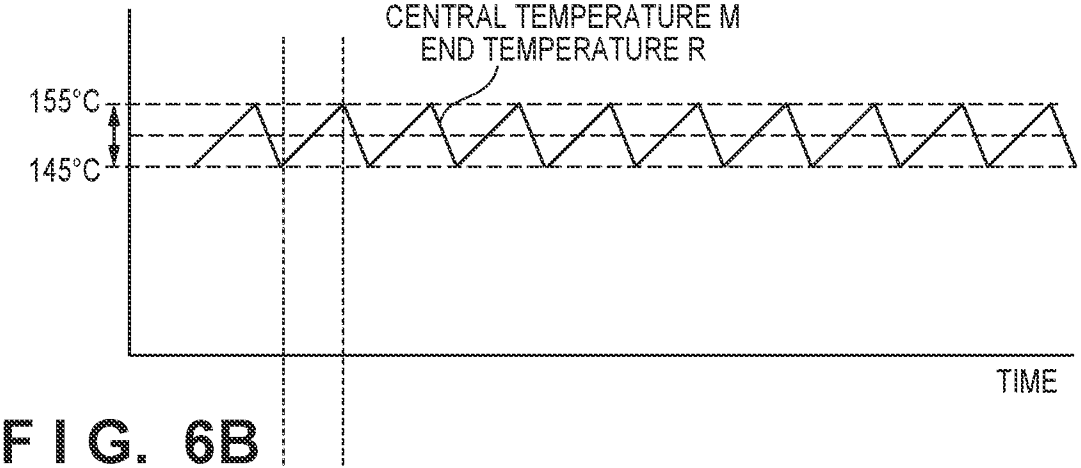
FIGS. 6A to 6D are diagrams illustrating long-time flicker.
Figure 6B:
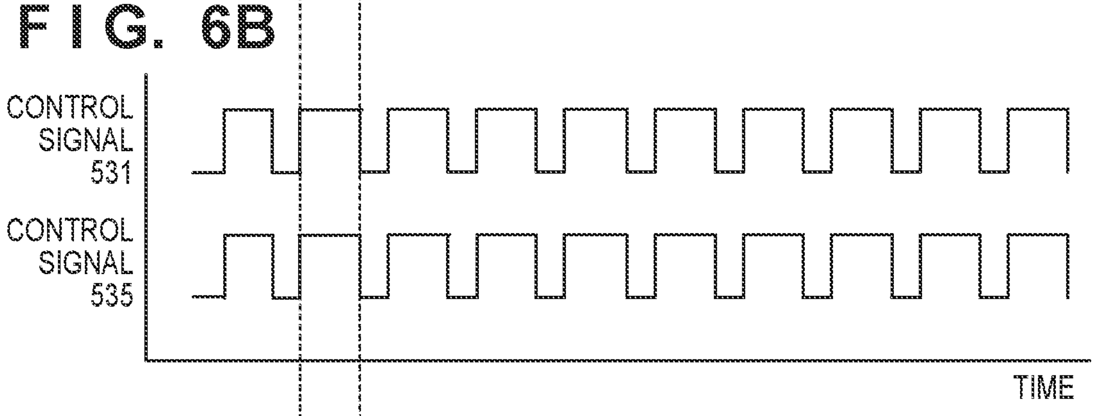
Figure 6C:
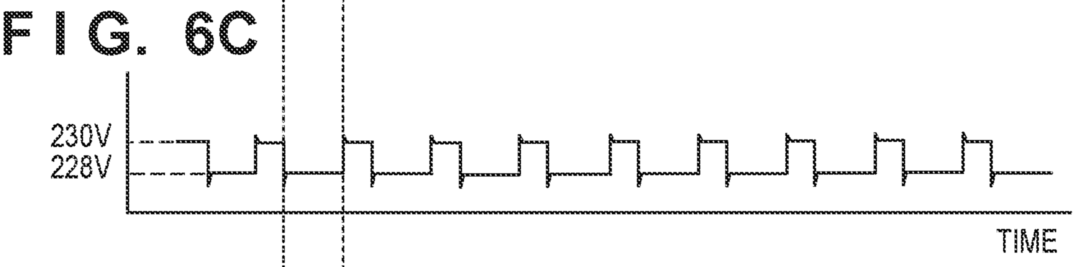
Figure 6D:
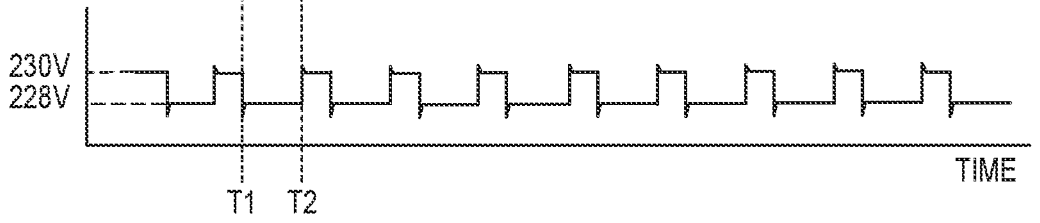

FIGS. 6A to 6D illustrate a state in which the long-time flicker is not good in a standby period of the image forming apparatus 100. FIG. 6A indicates the central temperature M detected by the thermistor 301 and the end temperature R detected by the thermistor 302. FIG. 6B indicates the control signals 531 and 535. The control signals 532 to 534 and 536 are all assumed to be off. FIG. 6C indicates the voltage of the first power system 511. FIG. 6D indicates the voltage of the second power system 512. In FIGS. 6A to 6D, the horizontal axis represents time.

The image forming apparatus 100 has an image forming period (image forming mode) during which an image is formed on the sheet P and a standby period (standby mode) during which no image is formed. The standby period (standby mode) is provided to reduce the power consumption of the image forming apparatus 100. The fixing belt 210 is preheated during the standby period. This is done to raise the temperature of the fixing belt 210 to a target temperature (a temperature at which toner images can be fixed) in a shorter time when transitioning from the standby period to the image forming period. The temperature of the fixing belt 210 during the standby period may be called a "preheat temperature" or a "standby temperature". The standby temperature is set lower than the target temperature. The closer the standby temperature is to the target temperature, the more quickly the fixing belt 210 can reach the target temperature. However, the closer the standby temperature is to the target temperature, the lower the reduction in power consumption is. Therefore, the standby temperature is designed in consideration of these tradeoffs.

In this manner, the total power consumption of the heaters 341 to 346 in the standby period is less than the total power consumption of the heaters 341 to 346 in the image forming period. Therefore, the standby temperature (e.g., 150° C.) can be achieved if only the heater 341, which mainly heats the central region, and the heater 345, which mainly heats the end regions, operate. Note that the standby temperature may be managed as a predetermined temperature range (e.g., at least 145° C. and no greater than 155° C.) defined by an upper limit temperature (e.g., 145° C.) and a lower limit temperature (e.g., 155° C.).

In FIG. 6A, the central temperature M is the detected value (resistance value) of the thermistor 301, converted to a temperature by the CPU 550. The end temperature R is the detected value of the thermistor 302, converted to a temperature by the CPU 550. Time T1 is a timing at which the central temperature M falls below 145° C. due to all of the heaters 341 to 346 being turned off. As illustrated in FIG. 6B, at time T1, the CPU 550 switches the control signals 531 and 535 from off (low) to on (high) to turn on the heater 341 and the heater 345, respectively. As a result, the switch 521 and the switch 525 switch from off to on, and power is supplied to the heater 341 and the heater 345.

Time T2 is a timing at which the central temperature M exceeds 155° C. At time T2, the CPU 550 switches the control signals 531 and 535 to low to turn off the heater 341 and the heater 345, respectively. As a result, the switches 521 and 525 switch from on to off, respectively, and the supply of power to the heater 341 and the heater 345 is stopped.

Such repeated turning on/off of the heaters 341 and 345 keeps the end temperature R and the central temperature M at the standby temperature (e.g., 150° C.). The heaters 341 and 345 repeatedly turn on and off simultaneously. The slope of the rise in temperature caused by turning on the heater and the slope of the fall in temperature caused by turning off the heater are both steep. In other words, the operation cycle of the heater 341 and the operation cycle of the heater 345 are both shortened. As illustrated in FIG. 6C, the voltage level of the first power system 511 fluctuates with the timing of the heater 341 turning on/off. As illustrated in FIG. 6D, the voltage level of the second power system 512 fluctuates with the timing of the heater 345 turning on/off. As the number of these fluctuations increases, the flicker worsens.

Figure 7A:
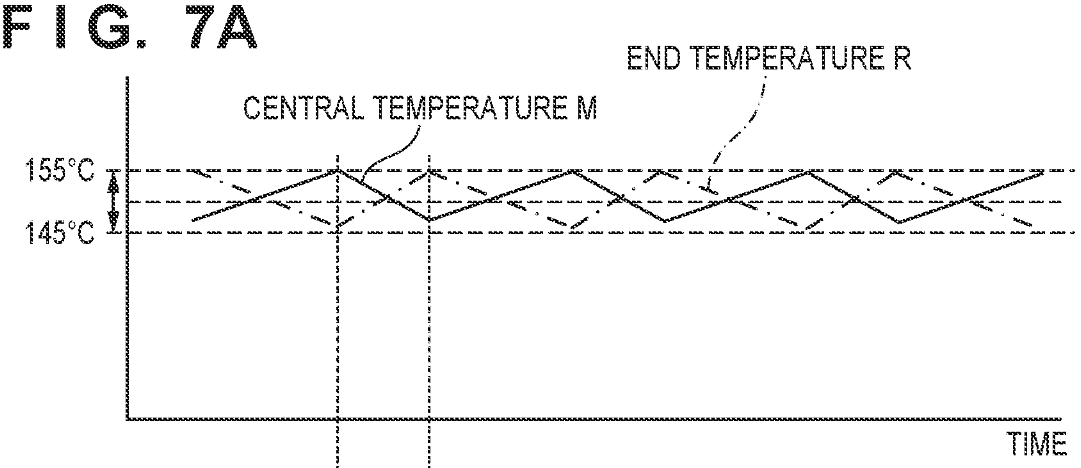
FIGS. 7A to 7D are diagrams illustrating a method for improving long-time flicker.
Figure 7B:
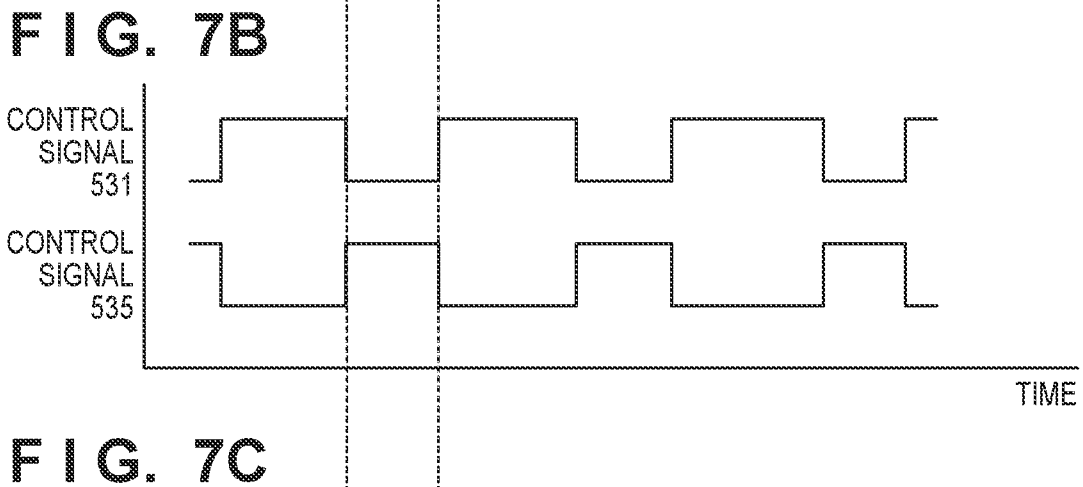
Figure 7C:
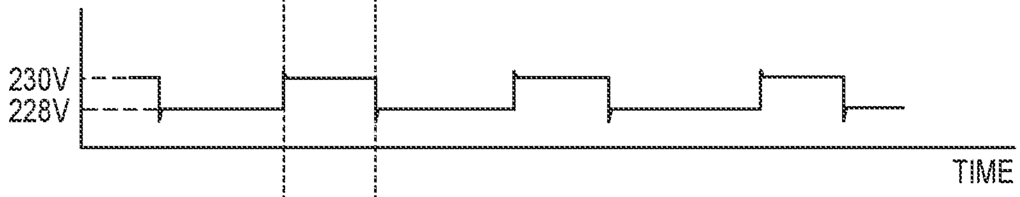
Figure 7D:
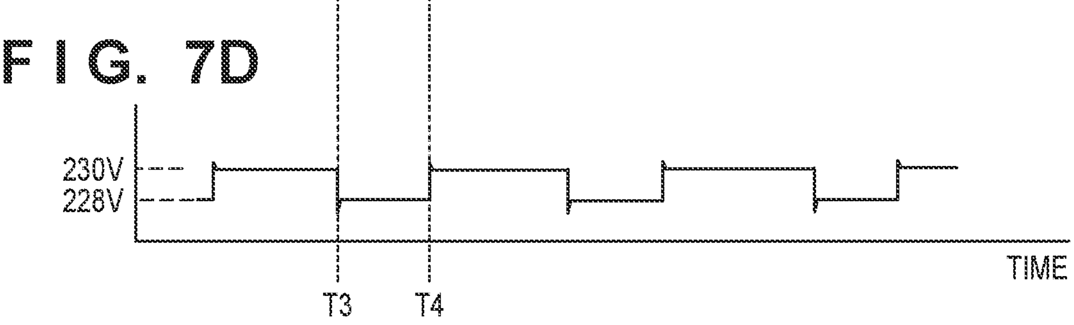

FIGS. 7A to 7D illustrate measures for improving the long-time flicker in the standby period of the image forming apparatus 100. FIG. 7A indicates the central temperature M detected by the thermistor 301 and the end temperature R detected by the thermistor 302. FIG. 7B indicates the control signals 531 and 535. The control signals 532 to 534 and 536 are all assumed to be off. FIG. 7C indicates the voltage of the first power system 511. FIG. 7D indicates the voltage of the second power system 512. In FIGS. 7A to 7D, the horizontal axis represents time.

As illustrated in FIGS. 7A and 7B, time T3 is the timing at which the central temperature M exceeds the upper limit temperature (155° C.) when the heater 341 is on and the heaters 342 to 346 are off. When the central temperature M exceeds the upper limit temperature, the CPU 550 generates the control signals 531 and 535 such that the heater 341 turns off and the heater 345 turns on. In other words, as illustrated in FIG. 7B, at time T3, the control signal 531 switches from high to low and the control signal 535 switches from low to high.

At time T4, the end temperature R exceeds the upper limit temperature (155° C.). Therefore, the CPU 550 switches the control signals 531 and 535 such that the heater 345 turns off and the heater 341 turns on. As illustrated in FIG. 7B, at time T4, the control signal 531 switches from low to high and the control signal 535 switches from high to low.

In this manner, the CPU 550 turns off the heater 341 and turns on the heater 345 when the central temperature M exceeds the upper limit temperature. Additionally, when the end temperature R exceeds the upper limit temperature, the CPU 550 turns on the heater 341 and turns off the heater 345. The CPU 550 repeats such switching control to keep the end temperature R and the central temperature M at the standby temperature (150° C.±5).

The heater 341 and heater 345 are repeatedly turned on/off in an alternating manner, which moderates the slope of the rise in temperature due to turning on and the slope of the fall in temperature due to turning off, respectively. In other words, the operation period of the heater 341 and the operation period of the heater 345 are longer, respectively. As illustrated in FIG. 7C, the number of voltage fluctuations in the first power system 511 is reduced. As illustrated in FIG. 7D, the number of voltage fluctuations in the second power system 512 is also reduced. Accordingly, the long-time flicker in the standby period is improved.

Power is supplied to the heater 341 from the power cord 501, and to the heater 345 from the power cord 502. In other words, the heaters 341 and 345 are connected to different AC power supply systems. Therefore, the flicker period is longer in the first embodiment than when the heaters 341 and 345 are connected to a single power cord.

Flowchart

Figure 8:
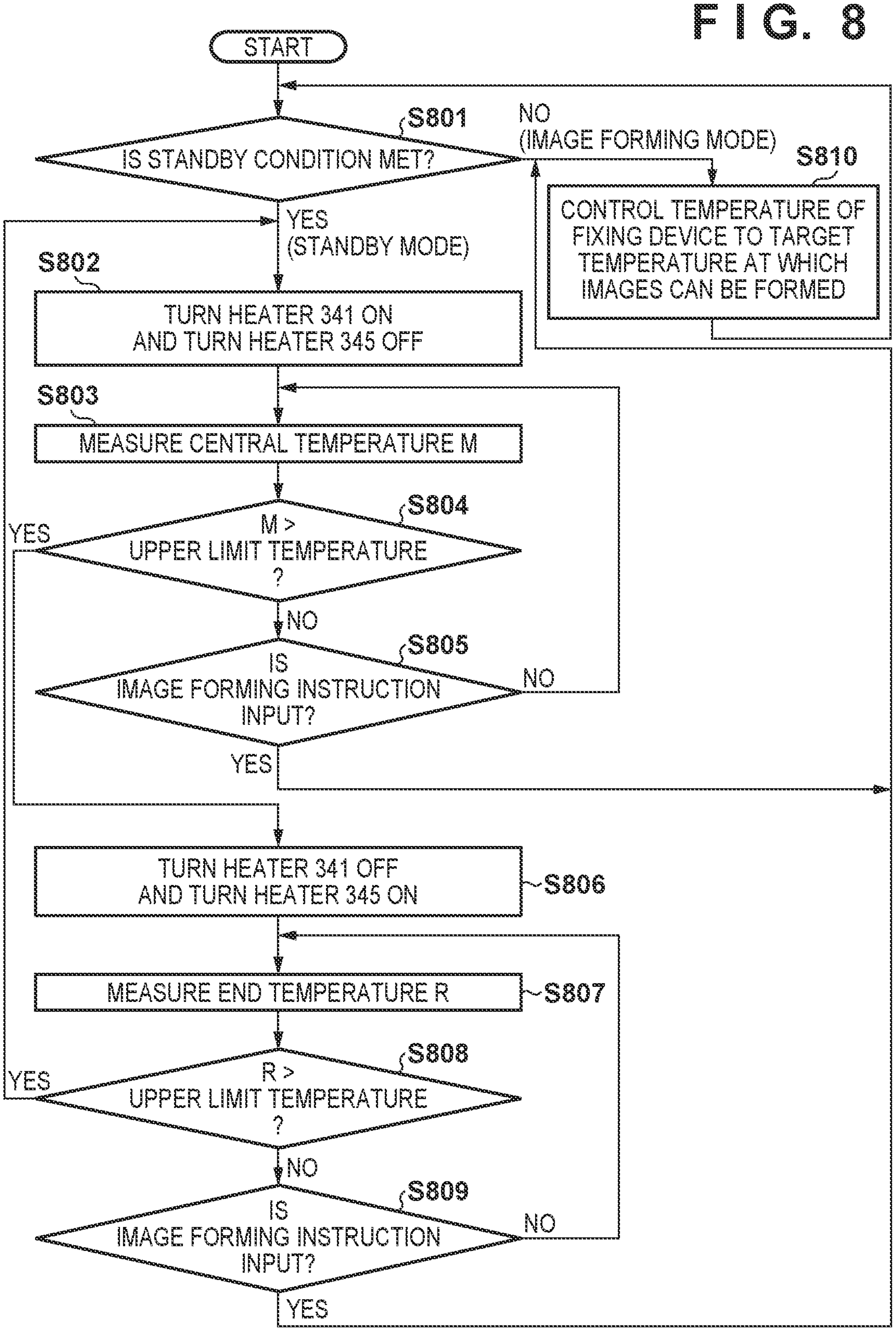
FIG. 8 is a flowchart illustrating a control method according to a first embodiment.

FIG. 8 illustrates a control method for the fixing device 120, executed by the CPU 550. The CPU 550 executes the following processing according to a control program. Here, control modes of the CPU 550 or operating modes of the image forming apparatus 100 include an image forming mode and a standby mode. The image forming mode is a mode in which the image forming apparatus 100 can form images. The standby mode is a mode in which the image forming apparatus 100 cannot form images, and may be referred to as a "power-saving mode".

In step S801, the CPU 550 determines whether a standby condition has been met. The standby condition is a condition that serves as a trigger for the switching of the image forming mode to the standby mode. An example of the standby condition is that the time that the image forming apparatus 100 is not forming images exceeds a threshold time. If the standby condition is not met, the CPU 550 moves the sequence to step S810. In step S810, the CPU 550 controls the temperature of the fixing device 120 to the target temperature at which images can be formed. This target temperature (e.g., 160° C. to 180° C.) is a temperature that is at least the standby temperature (e.g., 150° C.) described above.

For example, the CPU 550 selects the duty ratio of the heaters 341 to 346 according to the size and grammage of the sheet P, the presence or absence of gloss, and the like. Control information indicating a relationship between the size and grammage of the sheet P, the presence or absence of gloss, and the duty ratios of the heaters 341 to 346 is stored in a ROM region of the memory 560. The CPU 550 determines the duty ratio of the heaters 341 to 346 by referring to the control information stored in the memory 560. The CPU 550 generates and outputs the control signals 531 to 536 according to the selected duty ratio. The CPU 550 then moves the sequence to step S801. If the standby condition is met in step S801, the CPU 550 moves the sequence to step S802.

In step S802, the CPU 550 turns the heater 341 on and turns the heater 345 off. As a result, the central region is mainly heated. The heater 341 belongs to the first heater group 561, to which power is supplied from the first power system 511. The heater 345 belongs to the second heater group 562, to which power is supplied from the second power system 512. The first heater group 561 and the second heater group 562 turn on/off exclusively or in an alternating manner.

In step S803, the CPU 550 measures the central temperature M using the thermistor 301. The CPU 550 may convert the detected value output from thermistor 301 to the central temperature M, which is temperature information, by converting the value using a table stored in the ROM region of the memory 560.

In step S804, the CPU 550 determines whether the central temperature M exceeds the upper limit temperature (e.g., 155° C.). The upper limit temperature (e.g., 155° C.) is taking into account a control margin with respect to the standby temperature (e.g., 150° C.) as described above. The upper limit temperature (e.g., 155° C.) is stored in the ROM region of the memory 560. If the central temperature M does not exceed the upper limit temperature, the CPU 550 moves the sequence to step S805.

In step S805, the CPU 550 determines whether an image forming instruction has been input by a user. If an image forming instruction has been input, the CPU 550 switches the operating mode from the standby mode to the image forming mode, and moves the sequence to step S810.

On the other hand, if no image forming instruction has been input in step S805, the CPU 550 moves the sequence to step S803. The central temperature M is measured again in step S803. Await process may be provided such that the central temperature M is obtained every predetermined period (e.g., 100 ms).

If in step S804 the central temperature M exceeds the upper limit temperature, the CPU 550 moves the sequence to step S806. This corresponds to time T3 in FIG. 7.

In step S806, the CPU 550 turns the heater 341 off and turns the heater 345 on. As a result, the end region is mainly heated, and the temperature of the central region drops. In this manner, the first heater group 561 and the second heater group 562 turn on/off exclusively or in an alternating manner.

In step S807, the CPU 550 measures the end temperature R using the thermistor 302. The CPU 550 may convert the detected value output from thermistor 302 to the end temperature R, which is temperature information, by converting the value using a table stored in the ROM region of the memory 560.

In step S808, the CPU 550 determines whether the end temperature R exceeds the upper limit temperature (e.g., 155° C.). If the end temperature R does not exceed the upper limit temperature, the CPU 550 moves the sequence to step S809.

In step S809, the CPU 550 determines whether an image forming instruction has been input by a user. If an image forming instruction has been input, the CPU 550 switches the operating mode from the standby mode to the image forming mode, and moves the sequence to step S810.

On the other hand, if no image forming instruction has been input in step S809, the CPU 550 moves the sequence to step S807. The end temperature R is measured again in step S807. Await process may be provided such that the end temperature R is obtained every predetermined period (e.g., 100 ms). If in step S808 the end temperature R exceeds the upper limit temperature, the CPU 550 moves the sequence to step S802. This corresponds to time T4 in FIG. 7.

In this manner, according to the first embodiment, in the standby period, the heaters 341 and 345, each having a different power system, are turned on/off in an alternating manner. As a result, the central region and the end regions of the fixing belt 210 are heated in an alternating manner, and the temperature of the fixing belt 210 is kept at the standby temperature. In this manner, by turning on the heaters 341 and 345 in an alternating manner, the operation cycle of the heater 341 and the operation cycle of the heater 345 are both longer than the operation cycles when the heaters 341 and 345 are turned on simultaneously. In other words, flicker in the standby period is improved.

In the first embodiment, the on/off switching timing of the heater 341 coincides with the off/on switching timing of the heater 345, but this is merely one example. The period when the heater 341 is on and the period when the heater 345 is on may overlap. Additionally, the period when the heater 341 is off and the period when the heater 345 is on may overlap.

In the first embodiment, the heater 341, which mainly heats the central region, and the heater 345, which mainly heats the end region, are operated in an alternating manner in the standby period, but this is merely one example. To reduce flicker, it is sufficient for the first heater group 561 connected to the first power system 511 and the second heater group 562 connected to the second power system 512 to be turned on/off in an alternating manner. Here, it is sufficient for at least one of the heaters 341 to 343 in the first heater group 561 and at least one of the heaters 344 to 346 in the second heater group 562 to be turned on/off in an alternating manner.

Incidentally, the heat dissipation performance at the end region of the heating roller 240 is higher than at the central region. Therefore, the temperature at the end region tends to be lower than the temperature at the central region. Accordingly, the heater 342, which can uniformly heat the central region and the end regions, and the heater 344, which consumes less power and primarily heats the end regions, may be turned on/off in an alternating manner.

The heat dissipation performance of the end region may be increased beyond the heat dissipation performance of the central region by changing the shape of the heating roller 240. In this case, the heater 342, which can uniformly heat the central region and the end regions, and the heater 346, which primarily heats the central region, may be turned on/off in an alternating manner.

Second Embodiment

In the first embodiment, one heater 341 in the first heater group 561 and one heater 345 in the second heater group 562 are mainly turned on/off in an alternating manner. In a second embodiment, in the standby mode, the heater 344 in the second heater group 562 also participates in the heating of the heating roller 240. In other words, the heater 344 assists the heater 345. In the second embodiment, the descriptions in the first embodiment will be used for descriptions of matters common with the first embodiment.

Anti-Flicker

Figures 9A, 9B, 9C, 9D:
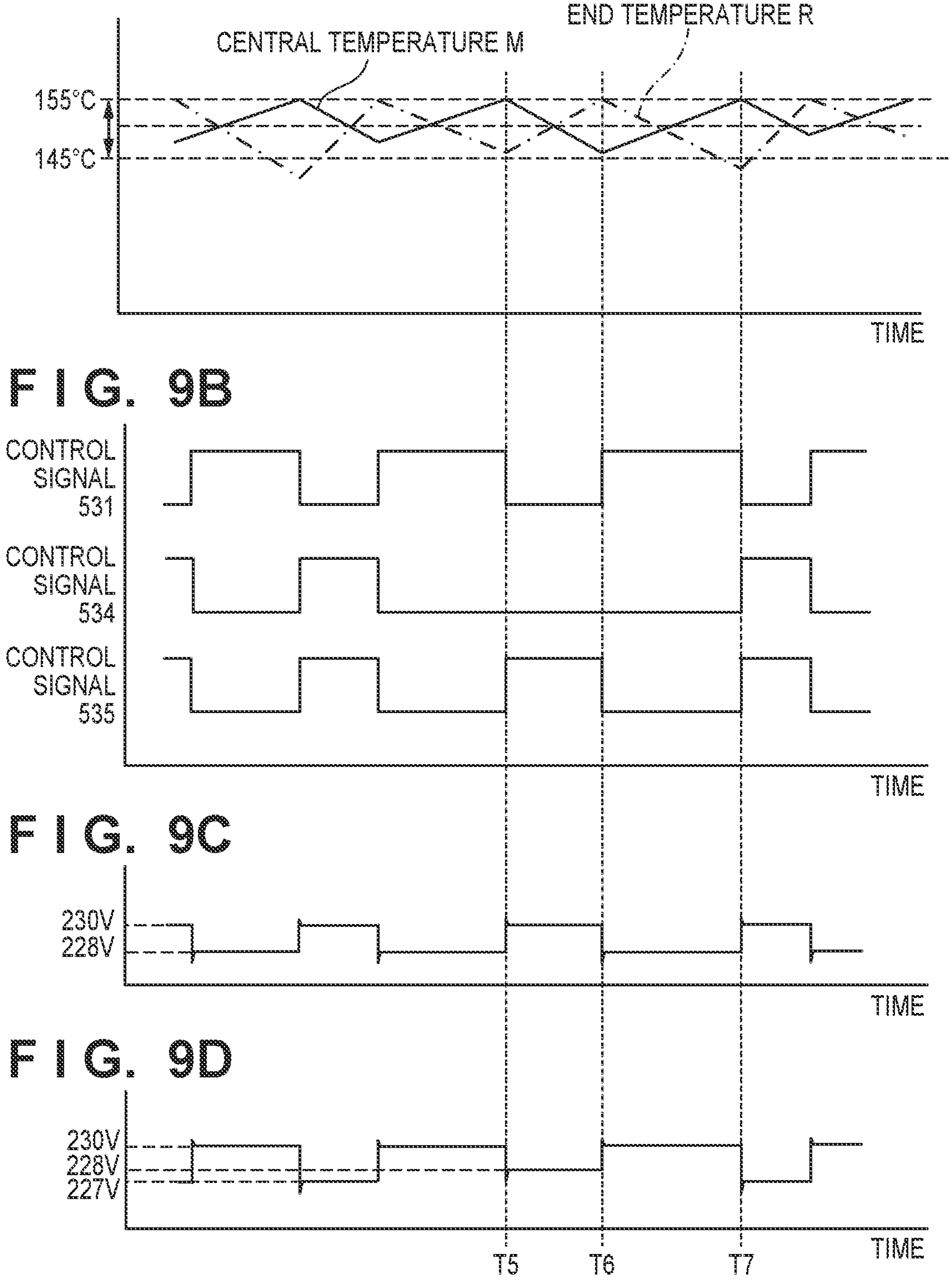
FIGS. 9A to 9D are diagrams illustrating a method for improving long-time flicker according to a second embodiment.

FIGS. 9A to 9D are diagrams illustrating the duty ratios of the heaters 341 to 346 in the standby period in the second embodiment. FIG. 9A indicates the central temperature M detected by the thermistor 301 and the end temperature R detected by the thermistor 302. FIG. 9B indicates the control signals 531, 534, and 535. The control signals 532, 533, and 536 are all assumed to be off. FIG. 9C indicates the voltage of the first power system 511. FIG. 9D indicates the voltage of the second power system 512. In FIGS. 9A to 9D, the horizontal axis represents time.

The power required by the fixing device 120 in the standby period is less than the power required by the fixing device 120 in the image forming period. Therefore, it is fundamental that only the heater 341, which mainly heats the central region, and the heater 345, which mainly heats the end region, are turned on in the standby period. In other words, as illustrated in FIG. 9B, the heater 341 and the heater 345 turn on/off in an alternating manner in the second embodiment.

FIG. 9A illustrates, as an example, that when the standby temperature is 150° C., a temperature control range in the standby period is from 145° C. to 155° C. Time T5 is the timing at which the central temperature M exceeds 155° C. with the heater 341 on and the heaters 342 to 346 off.

At time T5, the CPU 550 detects the end temperature R. If the end temperature R exceeds 145° C., the CPU 550 sets the levels of the control signals 531 and 535 such that the heater 341 is turned off and the heater 345 is turned on. In other words, the control signal 531 is switched from high to low and the control signal 535 is switched from low to high. As a result, the central temperature M begins to decrease and the end temperature R begins to increase.

Time T6 is the timing at which the end temperature R exceeds 155° C. At time T6, the CPU 550 turns the heater 345 off and turns the heater 341 on. In other words, the control signal 531 is switched from low to high and the control signal 535 is switched from high to low. As a result, the end temperature R begins to decrease and the central temperature M begins to increase.

Time T7 is a timing at which the central temperature M exceeds 155° C. At time T7, the CPU 550 turns the heater 341 off and turns the heater 345 on. Furthermore, at time T7, the CPU 550 detects the end temperature R. As illustrated in FIG. 9A, the end temperature R is no greater than 145° C. In other words, it is necessary for the end temperature R to rise rapidly. Accordingly, at time T7, the CPU 550 switches the control signal 534 from low to high and also turns on the heater 344. As illustrated in FIG. 4B, the heaters 344 and 345 have a higher heat generation capacity at the end regions. This causes a rapid rise in the end temperature R. In this manner, at time T7, the heaters 344 and 345 of the second heater group 562 connected to the second power system 512 are turned on simultaneously.

By repeating such heater control, the CPU 550 can keep the temperature of the fixing device 120 at the standby temperature (e.g., 150° C.). Because the heater 341 and the heater 345 are turned on/off in an alternating manner, the slope of the rise of the temperature and the slope of the fall of the temperature are both gradual. The end temperature R is detected at the timing when the heater 341 turns off. Whether the heater 344 is turned on/off is determined according to this end temperature R. This lengthens the on cycle while keeping the temperature of the fixing device 120 at the standby temperature. As illustrated in FIG. 9C, the number of voltage fluctuations in the first power system 511 is reduced. As illustrated in FIG. 9D, the number of voltage fluctuations in the second power system 512 is also reduced. Flicker is improved as a result. In addition, the heater 341 is connected to the first power system 511, and the heater 344 and the heater 345 are connected to the second power system 512. As such, the flicker period is longer, in the second embodiment as well, than when the heaters 341, 344, and 345 are connected to the same power system.

Flowchart

Figure 10:
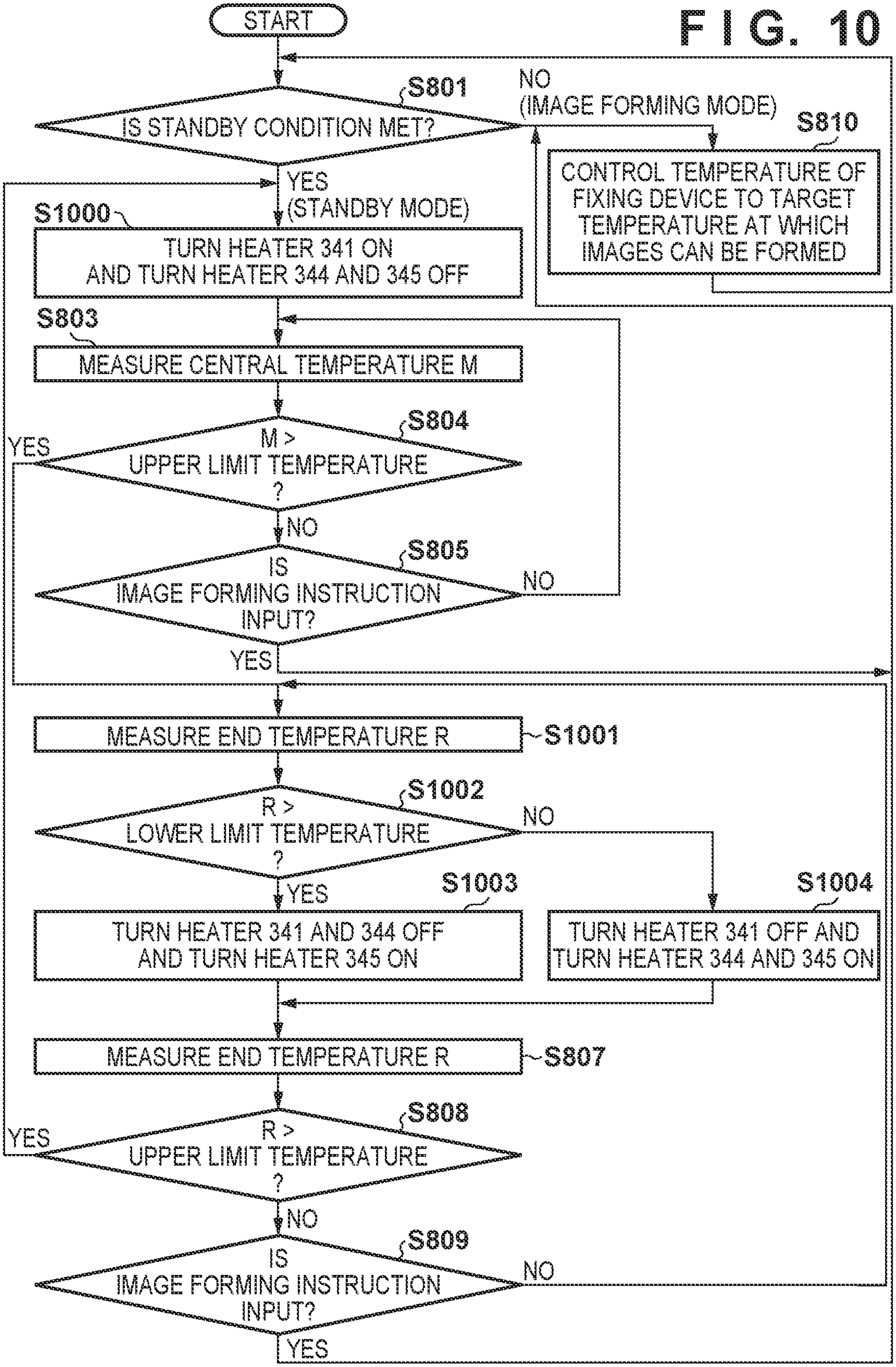
FIG. 10 is a flowchart illustrating a control method according to the second embodiment.

FIG. 10 illustrates a control method for the fixing device 120, executed by the CPU 550. The steps in FIG. 10 that differ from the steps in FIG. 8 will be described in detail below.

If the standby condition is met in step S801, the CPU 550 moves the sequence to step S1000. In step S1000, the CPU 550 turns the heater 341 on and turns the heaters 344 and 345 off. As a result, the central region is mainly heated. In the second embodiment as well, basically, the first heater group 561 and the second heater group 562 turn on/off exclusively or in an alternating manner. The CPU 550 then executes steps S803 to S805. In particular, if in step S804 the central temperature M exceeds the upper limit temperature, the CPU 550 moves the sequence to step S1001.

In step S1001, the CPU 550 measures the end temperature R using the thermistor 302. Await process may be provided such that the end temperature R is obtained every predetermined period (e.g., 100 ms).

In step S1002, the CPU 550 determines whether the end temperature R exceeds the lower limit temperature (e.g., 145° C.). If the end temperature R exceeds the lower limit temperature, the CPU 550 moves the sequence to step S1003. This corresponds to time T5.

In step S1003, the CPU 550 turns the heaters 341 and 344 off and turns the heater 345 on. As a result, the end temperature R can be caused to rise gradually while reducing the central temperature M. The CPU 550 then moves the sequence to step S807. If in step S1002 the end temperature R does not exceed the lower limit temperature, the CPU 550 moves the sequence to step S1004. This corresponds to time T7 in FIG. 9A.

In step S1004, the CPU 550 turns the heater 341 off and turns the heaters 344 and 345 on. As a result, the end temperature R can be caused to rise quickly while reducing the central temperature M. The CPU 550 then moves the sequence to step S807.

If a determination of "no" was made in step S809 in FIG. 8, the CPU 550 moved the sequence to step S807. In the second embodiment, if a determination of "no" in made in step S809, the CPU 550 may move the sequence to step S1001. This makes it possible for the heater 344, which assists heater 345, to be turned on/off according to the end temperature R. However, even in the second embodiment, the CPU 550 may move the sequence to step S807 if a determination of "no" in made in step S809.

In this manner, according to the second embodiment, in the standby period, the heater 341, and the heaters 344 and 345, which have different power systems, are turned on/off in an alternating manner. As a result, the central region and the end regions of the fixing belt 210 are heated in an alternating manner, and the temperature of the fixing belt 210 is kept at the standby temperature. In this manner, the heater 341 and the heaters 344 and 345 are turned on in an alternating manner. As a result, the operation cycle of the heater 341 and the operation cycle of the heaters 344 and 345 are both longer than the operation cycles when the heaters 341, 344, and 345 are turned on simultaneously. In other words, flicker in the standby period is improved.

Furthermore, when the central temperature M exceeds the upper limit temperature, the heater 344 is turned on/off according to the end temperature R. In other words, if the end temperature R is no greater than the lower limit temperature, the heater 344 is turned on. If the end temperature R exceeds the lower limit temperature, the heater 344 is kept off. Similar to the heater 345, the heater 344 is connected to the second power system 512, and is also a heat source that mainly heats the end region. The on/off switching of the heater 345 is basically linked to the on/off switching of the heater 344. Accordingly, the operation cycle of the second heater group 562 will still match the operation cycle of the heater 345. In other words, turning the auxiliary heater 344 on/off is unlikely to worsen the flicker.

In the second embodiment, the on/off switching timing of the heater 341 coincides with the off/on switching timing of the heater 344 and the heater 345, but this is merely one example. As also described in the first embodiment, the period when the heater 341 is on and the period when the heater 344 and the heater 345 are on may overlap. Furthermore, the period when heater 341 is off and the period when the heater 344 and the heater 345 are off may overlap.

Third Embodiment

The second embodiment described a case in which a plurality of heaters in the second heater group 562 (the heaters 344 and 345, which primarily heat the end regions) operate in the standby period. However, a plurality of heaters belonging to the first heater group 561 may operate in the standby period. For example, the heaters 341 and 342, which primarily heat the central region of the heating roller 240, may operate in the standby period.

Figure 11:
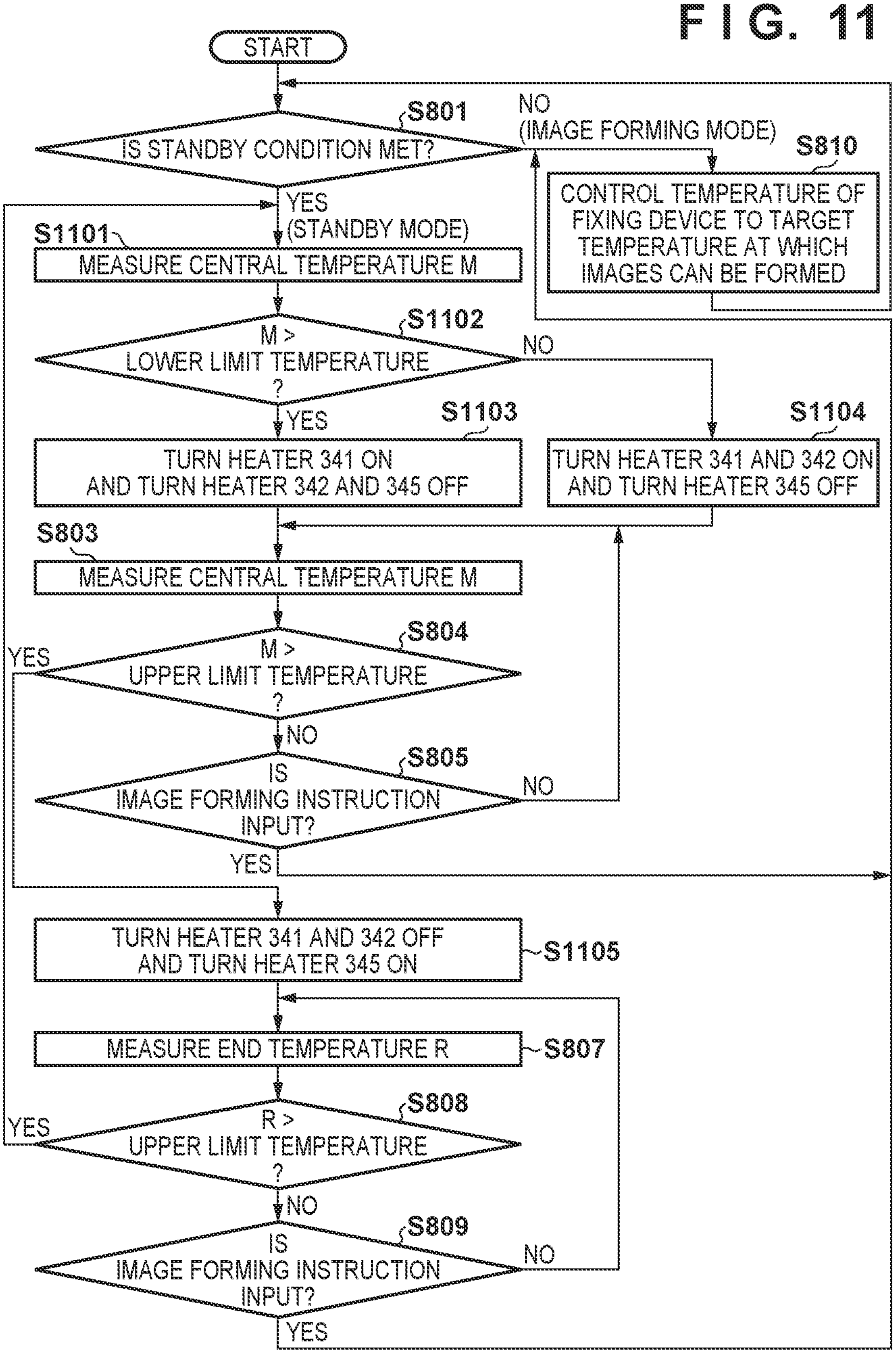
FIG. 11 is a flowchart illustrating a control method according to a third embodiment.

FIG. 11 illustrates a control method for the fixing device 120, executed by the CPU 550. The steps in FIG. 11 that differ from the steps in FIG. 8 or FIG. 10 will be described in detail below.

If the standby condition is met in step S801, the CPU 550 moves the sequence to step S1101.

In step S1101, the CPU 550 measures the central temperature M using the thermistor 301. Await process may be provided such that the central temperature M is obtained every predetermined period (e.g., 100 ms).

In step S1102, the CPU 550 determines whether the central temperature M exceeds the lower limit temperature (e.g., 145° C.). If the central temperature M exceeds the lower limit temperature, the CPU 550 moves the sequence to step S1103.

In step S1103, the CPU 550 turns the heater 341 on and turns the heaters 342 and 345 off. As a result, the central temperature M can be caused to rise gradually. The CPU 550 then moves the sequence to step S803. If in step S1102 the central temperature M does not exceed the lower limit temperature, the CPU 550 moves the sequence to step S1104.

In step S1104, the CPU 550 turns the heaters 341 and 342 on and the heater 345 off. As a result, the central temperature M can be caused to rise quickly. The CPU 550 then moves the sequence to step S803. Note that if a determination of "no" is made in step S805, the CPU 550 may move the sequence to step S1101.

If in step S804 the central temperature M exceeds the upper limit temperature, the CPU 550 moves the sequence to step S1105.

In step S1105, the CPU 550 turns the heaters 341 and 342 off and the heater 345 on. As a result, the end temperature R can be caused to rise while reducing the central temperature M.

In this manner, according to the third embodiment, in the standby period, the heaters 341 and 342, and the heater 345, which have different power systems, are turned on/off in an alternating manner. Note that the heater 342 is turned on only when it is necessary to assist the heater 341. As a result, the central region and the end regions of the fixing belt 210 are heated in an alternating manner, and the temperature of the fixing belt 210 is kept at the standby temperature. Additionally, the operation cycle of the heaters 341 and 342 and the operation cycle of the heater 345 are both longer than the operation cycles when the heaters 341, 342, and 345 are turned on simultaneously. In other words, flicker in the standby period is improved.

Fourth Embodiment

The fourth embodiment is a combination of the second embodiment and the third embodiment. In other words, a plurality of heaters 341 and 342 belonging to the first heater group 561 and a plurality of heaters 344 and 345 belonging to the second heater group 562 may operate in the standby period.

Figure 12:
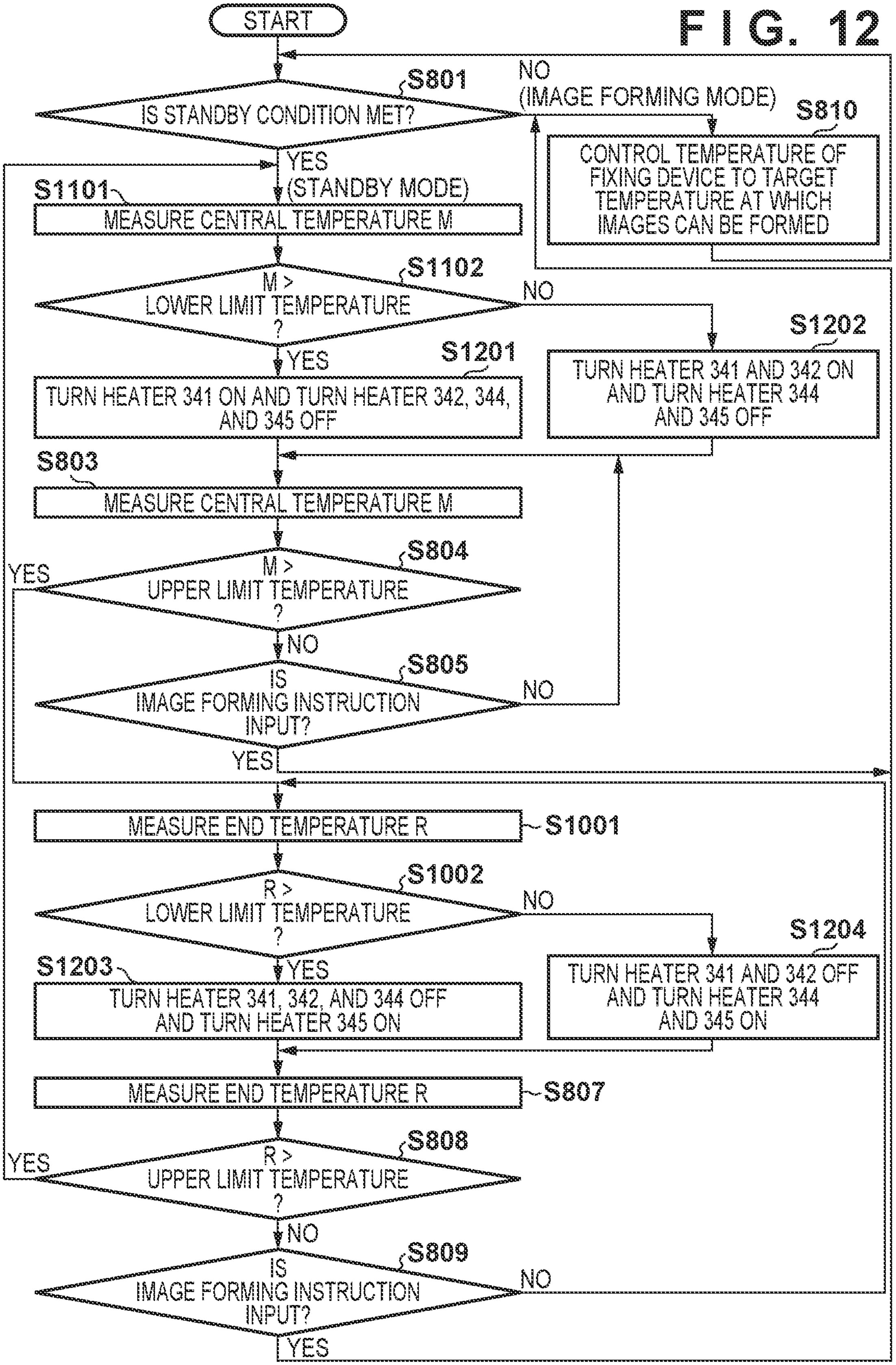
FIG. 12 is a flowchart illustrating a control method according to a fourth embodiment.

FIG. 12 illustrates a control method for the fixing device 120, executed by the CPU 550. The steps in FIG. 12 that differ from the steps in FIG. 8, FIG. 10, or FIG. 11 will be described in detail below.

Step S1103 in FIG. 11 is replaced with step S1201 in FIG. 12, and step S1104 in FIG. 11 is replaced with step S1202 in FIG. 12.

In step S1201, the CPU 550 turns the heater 341 on and the heaters 342, 344, and 345 off. In other words, if the central temperature M exceeds the lower limit temperature, the fixing belt 210 is heated by the heater 341 only.

On the other hand, in step S1202, the CPU 550 turns the heaters 341 and 342 on and the heaters 344 and 345 off. If the central temperature M is no greater than the lower limit temperature, the fixing belt 210 is heated by both the heaters 341 and 342.

Additionally, in FIG. 12, steps S1003 and S1004 in FIG. 10 are replaced by steps S1203 and S1204.

In step S1203, the CPU 550 turns the heaters 341, 342, and 344 off and the heater 345 on. In other words, if the end temperature R exceeds the lower limit temperature, the fixing belt 210 is heated by the heater 345 only.

On the other hand, in step S1204, the CPU 550 turns the heaters 341 and 342 off and the heaters 344 and 345 on. In other words, if the end temperature R is no greater than the lower limit temperature, the fixing belt 210 is heated by both the heaters 344 and 345.

Technical Spirit Derived from Embodiments

Aspect 1

As illustrated in FIG. 5 and the like, the power cord 501 is connected to the first power system 511, and the power cord 502 is connected to the second power system 512. The first heater group 561 includes at least one heater (e.g., the heaters 341 to 343) that generate heat upon being supplied with power from the first power system. The second heater group 562 includes at least one heater (e.g., the heaters 344 to 346) that generate heat upon being supplied with power from the second power system. The heating roller 240 and the fixing belt 210 function as a heat conduction medium that transfers the heat output from the first heater group and the second heater group to the toner image and the sheet. As illustrated in FIG. 3 and the like, the heating roller 240 and the fixing belt 210 are examples of a heat conduction medium extending in a direction (e.g., the Y direction) that intersects with the transport direction of the sheet P. The CPU 550 is an example of a control unit that controls the first heater group and the second heater group. The CPU 550 may be implemented by hardware circuitry such as an ASIC (Application Specific Integrated Circuit), a FPGA (Field Programmable Gate Array), or the like. The CPU 550 controls the temperature of the heat conduction medium to the fixing temperature (e.g., 160° C.) during a fixing period (an image forming period) in which the toner image is fixed to the sheet P. The CPU 550 controls the temperature of the heat conduction medium to a lower standby temperature than the fixing temperature (e.g., 150° C.) in the standby period prior to the fixing period. In the standby period, the CPU 550 may operate a first heater (e.g., the heater 341) included in the first heater group and a second heater (e.g., the heater 345) included in the second heater group in an alternating manner. In this manner, the CPU 550 is configured to keep the temperature of the heat conduction medium at the standby temperature. As illustrated in FIG. 4A, in the direction in which the first heater extends, the heat generation capacity of the center of the first heater (e.g., 100%) may be greater than or equal to the heat generation capacity of the ends of the first heater (e.g., 20%). As illustrated in FIG. 4B, in the direction in which the second heater extends, the heat generation capacity of the ends of the second heater may be greater than or equal to the heat generation capacity of the center of the second heater. In this manner, the first heater and the second heater generate heat in an alternating manner, and thus long-time flicker can be improved in the standby period of the image forming apparatus 100. Because the heat generation capacity of the first heater and the heat generation capacity of the second heater are set to complement each other, it is easy to keep the temperature of each surface region in the direction in which the heat conduction medium extends (the Y direction) generally uniform (e.g., the standby temperature±5° C.).

Aspect 2

In the standby period, the first heater and the second heater operating in an alternating manner may mean that the period in which the first heater generates heat and the period in which the second heater generates heat are longer than a period in which the first heater and the second heater generate heat simultaneously. For example, the period in which the first heater generates heat and the period in which the second heater generates heat may overlap. Alternatively, the period when the first heater is stopped and the period when the second heater is stopped may overlap.

Aspect 3

In the standby period, the first heater and the second heater operating in an alternating manner may mean that the second heater is stopped during the period when the first heater is operating and the first heater is stopped during the period when the second heater is operating. This is illustrated in FIG. 7B.

Aspect 4

The thermistor 301 is an example of a first temperature sensor that measures the temperature of the center of the heat conduction medium in the direction in which the heat conduction medium extends. The thermistor 302 is an example of a second temperature sensor that measures the temperature of an end of the heat conduction medium in the direction in which the heat conduction medium extends. The CPU 550 may control the first heater group and the second heater group based on a detection result from the first temperature sensor (e.g., the central temperature M) and a detection result from the second temperature sensor (e.g., the end temperature R).

Aspect 5

As illustrated in FIG. 8, in the standby period, the central temperature M may exceed the upper limit temperature (e.g., 155° C.), which is higher than the standby temperature (e.g., 150° C.). In this case, CPU 550 may stop the first heater and operate the second heater. The temperature at the end of the heat conduction medium (e.g., the end temperature R) may also exceed the upper limit temperature. In this case, CPU 550 may stop the second heater and operate the first heater. This makes it possible to reduce flicker while keeping the temperature of the fixing device 120 at the standby temperature.

Aspect 6

In the Y direction, the heat dissipation performance at the end of the heat conduction medium may be higher than the heat dissipation performance at the center of the heat conduction medium. As illustrated in FIG. 4A, in the direction in which the first heater (e.g., the heater 342) extends, the heat generation capacity of the center of the first heater may be equal to the heat generation capacity of the ends of the first heater. As illustrated in FIG. 4B, in the direction in which the second heater (e.g., the heater 344) extends, the heat generation capacity of the center of the second heater may be higher than the heat generation capacity of the ends of the second heater.

Aspect 7

As described in the first embodiment, the first heater group may include a third heater (e.g., the heater 342) that operates in the fixing period and does not operate in the standby period. As illustrated in FIG. 4A, in the direction in which the third heater extends, the heat generation capacity of the ends of the third heater may be equal to the heat generation capacity of the center of the third heater.

Aspect 8

The first heater group may further include a fourth heater (e.g., the heater 343) that operates in the fixing period and does not operate in the standby period. As illustrated in FIG. 4A, in the direction in which the fourth heater extends, the heat generation capacity of the ends of the fourth heater may be higher than the heat generation capacity of the center of the fourth heater. This makes it possible to set the target temperature in the fixing period to be higher than the standby temperature.

Aspect 9

The second heater group may further include a fifth heater (e.g., the heater 344) that operates in the fixing period and does not operate in the standby period. As illustrated in FIG. 4B, in the direction in which the fifth heater extends, the heat generation capacity of the ends of the fifth heater may be higher than the heat generation capacity of the center of the fifth heater. This makes it possible to set the target temperature in the fixing period to be higher than the standby temperature.

Aspect 10

The second heater group may further include a sixth heater (e.g., the heater 346) that operates in the fixing period and does not operate in the standby period. As illustrated in FIG. 4B, in the direction in which the sixth heater extends, the heat generation capacity of the center of the sixth heater may be higher than the heat generation capacity of the ends of the sixth heater. This makes it possible to set the target temperature in the fixing period to be higher than the standby temperature.

Aspect 11

As described in the second embodiment, the second heater group may further include a seventh heater (e.g., the heater 344) that operates in both the fixing period and the standby period. As illustrated in FIG. 4B, in the direction in which the seventh heater extends, the heat generation capacity of the ends of the seventh heater may be higher than the heat generation capacity of the center of the seventh heater. This makes it possible for the seventh heater to assist the second heater in the fixing period and the standby period.

Aspect 12

As illustrated in FIG. 10, the CPU 550 may turn off the first heater and turn on the second heater and the seventh heater if the central temperature M of the heat conduction medium exceeds the upper limit temperature and the end temperature R is no greater than the lower limit temperature in the standby period. If the central temperature M exceeds the upper limit temperature and the end temperature R exceeds the lower limit temperature, the CPU 550 may turn off the first heater and the seventh heater and turn on the second heater. When the end temperature exceeds the upper limit temperature, the second heater and the seventh heater may be turned off and the first heater may be turned on.

Aspect 13

As described in the third embodiment, the heater 342 is an example of an eighth heater that is provided in the first heater group and operates in the fixing period and the standby period. There are cases where the central temperature M does not exceed the upper limit temperature and is no greater than the lower limit temperature (No in step S1102). In this case, the CPU 550 may turn on the first heater and the eighth heater and turn off the second heater. There are cases where the central temperature M does not exceed the upper limit temperature and also exceeds the lower limit temperature (Yes in step S1102). In this case, the CPU 550 may turn on the first heater and turn off the second heater and the eighth heater. If the central temperature M then exceeds the upper limit temperature, the CPU 550 may turn off the first heater and the eighth heater and turn on the second heater.

Aspect 14

As described in the fourth embodiment, the heater 344 is an example of a ninth heater that is provided in the second heater group and operates in the fixing period and the standby period. There are cases where the central temperature M does not exceed the upper limit temperature and is no greater than the lower limit temperature (No in step S1103). In this case, the CPU 550 may turn on the first heater and the eighth heater and turn off the second heater and the ninth heater. There are cases where the central temperature does not exceed the upper limit temperature and also exceeds the lower limit temperature (Yes in step S1102). In this case, the CPU 550 may turn on the first heater and turn off the second heater, the eighth heater, and the ninth heater. There are cases where when or after the central temperature M exceeds the upper limit temperature, the end temperature R exceeds the lower limit temperature (Yes in step S1002). In this case, the CPU 550 may turn off the first heater, the eighth heater, and the ninth heater, and turn on the second heater. There are cases where when or after the central temperature M exceeds the upper limit temperature, the end temperature R is not greater than the lower limit temperature (No in step S1002). In this case, the CPU 550 may turn off the first heater and the eighth heater, and turn on the second heater and the ninth heater.

Aspect 15

As described at the end of the first embodiment, in the Y direction, the heat dissipation performance at the center of the heat conduction medium may be higher than the heat dissipation performance at the ends of the heat conduction medium. In this case, in the direction in which the first heater (e.g., the heater 342) extends, the heat generation capacity of the center of the first heater may be equal to the heat generation capacity of the ends of the first heater. In the direction in which the second heater (e.g., the heater 346) extends, the heat generation capacity of the center of the second heater may be higher than the heat generation capacity at the ends of the second heater.

Aspects 16 and 17

The heat conduction medium may include a rotating body that rotates so as to make contact with the sheet P (e.g., the fixing belt 210), and a roller than drives the rotating body or that is driven by the rotating body (e.g., the heating roller 240). As illustrated in FIGS. 2 and 3, the first heater group and the second heater group may be provided inside the roller. The rotating body may be an endless belt stretched over rollers (e.g., the fixing belt 210). The rotating body may be a cylindrical or circular column-shaped roller or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-120810, filed Jul. 21, 2021 which is hereby incorporated by reference herein in its entirety.

What is claimed is:

1. An image forming apparatus comprising:

an image forming unit configured to form an image on a sheet;

a fixing unit configured to fix the image to the sheet, the fixing unit including:

a first heater to which a first current is supplied from a first commercial power source to generate heat, the first heater including a first region capable of heating and a second region capable of heating, the first region and the second region being located at different positions in a lengthwise direction, and a heat generation capacity in the first region being higher than a heat generation capacity in the second region;

a first switch provided in a current line between the first commercial power source and the first heater and configured to switch whether or not to supply the first current to the first heater;

a second heater to which a second current is supplied from a second commercial power source different from the first commercial power source to generate heat, a heat generation distribution characteristic in a lengthwise direction of the second heater being different from a heat generation distribution characteristic in a lengthwise direction of the first heater, the second heater including a third region capable of heating and a fourth region capable of heating, the third region and the fourth region being located at different positions in a lengthwise direction, a heat generation capacity in the third region of the second heater in the lengthwise direction being lower than a heat generation capacity in the fourth region, different from the third region, of the second heater in the lengthwise direction, wherein in the lengthwise direction of the first heater, the first region of the first heater and the third region of the second heater overlap, and in the lengthwise direction of the first heater, the second region of the first heater and the fourth region of the second heater overlap; and a second switch provided in a current line between the second commercial power source and the second heater and configured to switch whether or not to supply the second current to the second heater; and a controller configured to:

in an image forming mode in which the image is formed on the sheet, control the first switch and the second switch to keep a temperature of the fixing unit at a fixing temperature serving as a target temperature for fixing the image on the sheet; and in a standby mode in which the image is not formed on the sheet, control the first switch and the second switch to keep the temperature of the fixing unit at a standby temperature as a target temperature in the standby mode, and control the first switch and the second switch such that a period in which the first current is supplied to the first heater and a period in which the second current is supplied to the second heater do not overlap.

2. The image forming apparatus according to claim 1, wherein the fixing unit further includes a third heater to which a third current is supplied from the first commercial power source to generate heat, and a fourth heater to which a fourth current is supplied from the second commercial power source to generate heat, the controller cuts the supply of the third current to the third heater in the standby mode, and the controller cuts the supply of the fourth current to the fourth heater in the standby mode.

3. The image forming apparatus according to claim 1, wherein the first region corresponds to a region, in the lengthwise direction of the first heater, that is different from an end region, the second region corresponds to the end region in the lengthwise direction of the first heater, the third region corresponds to a region, in the lengthwise direction of the second heater, that is different from an end region, and the fourth region corresponds to the end region in the lengthwise direction of the second heater.

4. The image forming apparatus according to claim 1, further comprising:

a first temperature sensor configured to detect a temperature at a first position of the fixing unit; and a second temperature sensor configured to detect a temperature at a second position, different from the first position, of the fixing unit, wherein in the standby mode, the controller controls the first switch and the second switch such that the temperature detected by the first temperature sensor and the temperature detected by the second temperature sensor stay at the standby temperature.

5. The image forming apparatus according to claim 1, wherein the standby temperature has a temperature range from an upper limit temperature to a lower limit temperature.

6. The image forming apparatus according to claim 1, wherein the first heater comprise a halogen heater, and the second heater comprises a halogen heater.

7. The image forming apparatus according to claim 1, wherein the standby temperature is lower than the fixing temperature.

8. An image forming apparatus comprising:

an image forming unit configured to form an image on a sheet;

a fixing unit configured to fix the image to the sheet, the fixing unit including:

a first heater to which a first current is supplied from a first commercial power source to generate heat, the first heater including a first region capable of heating and a second region capable of heating, the first region and the second region being located at different positions in a lengthwise direction, and a heat generation capacity in the first region being higher than a heat generation capacity in the second region;

a first switch provided in a current line between the first commercial power source and the first heater and configured to switch whether or not to supply the first current to the first heater;

a second heater to which a second current is supplied from a second commercial power source different from the first commercial power source to generate heat, a heat generation distribution characteristic in a lengthwise direction of the second heater being different from a heat generation distribution characteristic in a lengthwise direction of the first heater, the second heater including a third region capable of heating and a fourth region capable of heating, the third region and the fourth region being located at different positions in a lengthwise direction, a heat generation capacity in the third region of the second heater in the lengthwise direction being lower than a heat generation capacity in the fourth region, different from the third region, of the second heater in the lengthwise direction;

wherein in the lengthwise direction of the first heater, the first region of the first heater and the third region of the second heater overlap, and in the lengthwise direction of the first heater, the second region of the first heater and the fourth region of the second heater overlap; and a second switch provided in a current line between the second commercial power source and the second heater and configured to switch whether or not to supply the second current to the second heater; and a controller configured to:

in an image forming mode in which the image is formed on the sheet, control the first switch and the second switch to keep a temperature of the fixing unit at a fixing temperature serving as a target temperature for fixing the image on the sheet; and in a standby mode in which the image is not formed on the sheet, control the first switch and the second switch to keep the temperature of the fixing unit at a standby temperature as a target temperature in the standby mode, and control the first switch and the second switch such that a timing at which the first current starts being supplied from the first commercial power source and a timing at which the second current starts being supplied from the second commercial power source are different in order to make a speed at which the temperature of the fixing unit rises lower than in a case where the timing at which the first current starts being supplied from the first commercial power source and the timing at which the second current starts being supplied from the second commercial power source are the same.

9. The image forming apparatus according to claim 8, wherein the fixing unit further includes a third heater to which a third current is supplied from the first commercial power source to generate heat, and a fourth heater to which a fourth current is supplied from the second commercial power source to generate heat, the controller cuts the supply of the third current to the third heater in the standby mode, and the controller cuts the supply of the fourth current to the fourth heater in the standby mode.

10. The image forming apparatus according to claim 8, wherein the first region corresponds to a region, in the lengthwise direction of the first heater, that is different from an end region, the second region corresponds to the end region in the lengthwise direction of the first heater, the third region corresponds to a region, in the lengthwise direction of the second heater, that is different from an end region, and the fourth region corresponds to the end region in the lengthwise direction of the second heater.

11. The image forming apparatus according to claim 8, further comprising:

a first temperature sensor configured to detect a temperature at a first position of the fixing unit; and a second temperature sensor configured to detect a temperature at a second position, different from the first position, of the fixing unit, wherein in the standby mode, the controller controls the first switch and the second switch such that the temperature detected by the first temperature sensor and the temperature detected by the second temperature sensor stay at the standby temperature.

12. The image forming apparatus according to claim 8, wherein the standby temperature has a temperature range from an upper limit temperature to a lower limit temperature.

13. The image forming apparatus according to claim 8, wherein the first heater comprises a halogen heater, and the second heater comprises a halogen heater.

14. The image forming apparatus according to claim 8, wherein the standby temperature is lower than the fixing temperature.

* * * * *